United States Patent
Sato et al.

(10) Patent No.: US 7,854,656 B2
(45) Date of Patent: Dec. 21, 2010

(54) GAME APPARATUS AND STORAGE MEDIUM HAVING GAME PROGRAM STORED THEREON

(75) Inventors: Kenta Sato, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1132 days.

(21) Appl. No.: 11/406,275

(22) Filed: Apr. 19, 2006

(65) Prior Publication Data

US 2007/0213109 A1 Sep. 13, 2007

(30) Foreign Application Priority Data

Mar. 13, 2006 (JP) .............................. 2006-067771

(51) Int. Cl.
  *G06F 19/00* (2006.01)
(52) U.S. Cl. ................. 463/36; 463/3; 463/37; 345/156
(58) Field of Classification Search ............... 463/3, 463/37, 38, 36; 345/156
  See application file for complete search history.

(56) References Cited

U.S. PATENT DOCUMENTS

| | | | |
|---|---|---|---|
| 4,839,838 A | 6/1989 | LaBiche et al. | |
| 5,574,479 A | 11/1996 | Odell | |
| 5,587,558 A | 12/1996 | Matsushima | |
| 5,598,187 A | 1/1997 | Ide et al. | |
| 5,627,565 A | 5/1997 | Morishita et al. | |
| 5,819,206 A | 10/1998 | Horton et al. | |
| 6,522,331 B1 * | 2/2003 | Danks | 345/473 |
| 6,709,351 B2 * | 3/2004 | Hori | 473/455 |
| 6,767,282 B2 | 7/2004 | Matsuyama et al. | 463/3 |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |

(Continued)

FOREIGN PATENT DOCUMENTS

EP     1 271 099 A2    1/2003

(Continued)

OTHER PUBLICATIONS

ADXL202 Specification Sheet: Low Cost ± 2 g Dual Axis i MEMs® Accelerometer with Digital Output; Analog Devices, Inc., 1998.

(Continued)

*Primary Examiner*—James S McClellan
*Assistant Examiner*—Lawrence Galka
(74) *Attorney, Agent, or Firm*—Nixon & Vanderhye P.C.

(57) ABSTRACT

Operation information which is output in accordance with a motion of an input device is sequentially obtained. First behavior information representing a state of an object after a first time period, which is a part of a recognition period, is set in accordance with operation information obtained during the first time period using operation information, so as to sequentially change the state of the object. Second behavior information representing a state of the object after a second time period, which is terminated after the first time period and is at least a part of the recognition period, in accordance with operation information obtained during the second time period. Based on at least the second behavior information, the state of the object is sequentially changed after the second time period.

40 Claims, 27 Drawing Sheets

U.S. PATENT DOCUMENTS

| | | | |
|---|---|---|---|
| 7,292,151 | B2 | 11/2007 | Ferguson et al. |
| 7,414,611 | B2 | 8/2008 | Liberty |
| 2003/0043154 | A1* | 3/2003 | Nimura et al. ............... 345/474 |
| 2003/0078086 | A1* | 4/2003 | Matsuyama et al. ............ 463/3 |
| 2004/0036673 | A1* | 2/2004 | Boswell et al. ............. 345/156 |
| 2005/0210418 | A1 | 9/2005 | Marvit et al. |
| 2008/0280660 | A1* | 11/2008 | Ueshima et al. ................ 463/3 |

FOREIGN PATENT DOCUMENTS

| | | |
|---|---|---|
| JP | 11-114230 | 4/1999 |
| JP | 2002-153673 | 5/2002 |
| JP | 2003-047766 | 2/2003 |
| JP | 2003-126548 | 5/2003 |

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http:// www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/people/awilson/wand/default.htm.

Wilson, Andrew, et al.; "XWand: UI for Intelligent Spaces"; Microsoft Research; CHI 2003, Apr. 5-10, 2003; Ft. Lauderale, FL.

Seletech Air Mouse, Description; retrieved on May 5, 2009 from http://cgi.ebay.com.my/ws/eBayISAPI.dll48 ViewItem &Item=350096666675&indexURL.

Japanese Official Action issued in connection with corresponding Japanese Patent Application No. 2006-067771, dated Jul. 2, 2008.

Extended European Search Report mailed Jun. 21, 2010 in European Application No. 06008516.4.

Choi et al., "Beatbox Music Phone: Gesture-Based Interactive Mobile Phone Using a Tri-Axis Accelerometer," Industrial Technology, IEEE International Conference on Hong Kong, Dec. 14-17, 2005, pp. 97-102.

* cited by examiner

F I G. 25

| | NO TWIST | LEFTWARD TWIST | RIGHTWARD TWIST |
|---|---|---|---|
| LEFTWARD SWING | NO SPIN | TOPSPIN<br>UP-DOWN DIRECTION: RAPIDLY GOES DOWN<br>LEFT-RIGHT DIRECTION: NO CHANGE | BACKSPIN<br>UP-DOWN DIRECTION: FLYING DISTANCE INCREASES<br>LEFT-RIGHT DIRECTION: CURVES RIGHTWARD |
| RIGHTWARD SWING | NO SPIN | BACKSPIN<br>UP-DOWN DIRECTION: FLYING DISTANCE INCREASES<br>LEFT-RIGHT DIRECTION: CURVES LEFTWARD | TOPSPIN<br>UP-DOWN DIRECTION: RAPIDLY GOES DOWN<br>LEFT-RIGHT DIRECTION: NO CHANGE |

F I G. 2 6
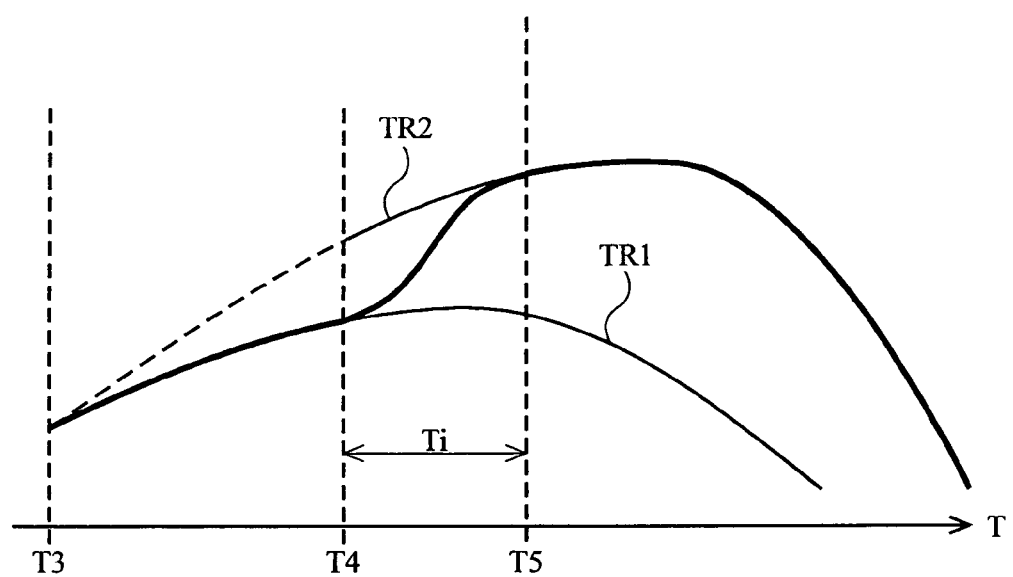

GAME APPARATUS AND STORAGE MEDIUM HAVING GAME PROGRAM STORED THEREON

CROSS REFERENCE OF RELATED APPLICATION

The disclosure of Japanese Patent Application No. 2006-067771 is incorporated herein by reference.

BACKGROUND

1. Field of the Technology

The technology presented herein relates to a game apparatus and a storage medium having a game program stored thereon, and more particularly to a game apparatus for changing a state of a game object in accordance with an input given from an input device and a storage medium having a game program for performing the same stored thereon.

2. Description of the Background Art

Conventionally, apparatuses have been developed for determining a motion of an input device operated by a user. The input device includes an acceleration sensor, and the motion of the input device is determined using an output from the acceleration sensor. For example, Japanese Laid-Open Patent Publication No. 2002-153673 (hereinafter, referred to as "patent document 1") discloses a game apparatus including a game controller which is formed like a boxing glove and has a triaxial acceleration sensor. With the game apparatus, a user can enjoy a game using an output from the triaxial acceleration sensor.

The controller (glove) disclosed by patent document 1 includes a triaxial acceleration sensor having a sensor X, a sensor Y and a sensor Z. When a drastically large value is input to the sensor Y, the game apparatus traces back an output waveform obtained from the sensor Y and sets a time around value 0 as time t0. A time at which value 0 or the vicinity thereof is obtained after the output waveform shows a drastically small value is set as time t1. An acceleration detected between time t0 and time t1 is extracted from an output waveform from each of the sensors X and Z. Using the output waveform of each component, the game apparatus determines the type of the punch (for example, straight, hook, uppercut, etc.). Specifically, in the case where the output waveform from the sensor X shows a slightly positive value and the output waveform from the sensor Z does not change, the game apparatus determines that the player has given a straight punch. In the case where the output waveform from the sensor X shows a negative value at the start of operation and then shows a positive value and the waveform from the sensor Z does not change, the game apparatus determines that the player has given a hook. In the case where the waveform from the sensor X is infinite and the waveform from the sensor Z shows a large negative value and then shows a positive value, the game apparatus determines that the player has given an uppercut.

As shown in FIG. 27, the game apparatus disclosed by patent document 1 determines the type of the punch using an output waveform representing an acceleration obtained during a motion recognition period from t0 to t1. Therefore, the game apparatus can actually determine the type of the punch given by the player only after the player gives the punch (after time t1). Patent document 1 describes that after the type of the punch is determined, the opponent character (another character) is hit by the punch. However, patent document 1 does not describe displaying an animation of the player character, which is to be operated by the player, giving a punch. For displaying an animation of the player character giving a punch, the game apparatus described in patent document 1 starts animation processing after the motion recognition period is over. As a result, a delay occurs for motion recognition, and the sense of maneuverability is spoiled. Since the result of the motion recognition cannot be reflected on the game processing in real time, the operation provided by the player cannot be responded by a real-time game performance.

SUMMARY

Therefore, a feature of an example embodiment presented herein is to provide a game apparatus usable in a game of changing a game object in accordance with an input given from an input device and capable of changing the object in real time in accordance with such an input, and a storage medium having a game program capable of the same stored thereon.

The present embodiment has the following features to attain the above. The reference numerals, step numbers and the like in parentheses in this section of the specification indicate the correspondence with the embodiment described later for easier understanding of the present embodiment, and do not limit the present embodiment in any way.

A first aspect of the present embodiment is directed to a game apparatus (3) for executing game processing of changing a state of an object (BC, PC) in accordance with an input given to an input device (7). The game apparatus comprises storage means (33), data obtaining means (S61, S64, S77 and S92 executed by the CPU 30; hereinafter only the step numbers will be indicated), first behavior setting means (S75, S76, S94), first object processing means (S94), second behavior setting means (S104, S106), second object processing means (S107), and display control means (S75, S76, S94, S104, S107, S109). The data obtaining means sequentially obtains operation information (Da) which is output in accordance with a motion of the input device and stores the operation information in the storage means. The first behavior setting means sets first behavior information (TR1, animation of hitting the ball, animation of missing the shot) representing a state of the object after a first time period (time T1 to time T2), which is a part of a recognition period (time T1 to time T4 during which motion recognition processing is executed) for determining a motion of the input device, in accordance with operation information obtained during the first time period using operation information. The first object processing means sequentially changes the state of the object after the first time period (time T2 to time T4) based on the first behavior information (S92 through S95). The second behavior setting means sets second behavior information (TR2, animation adjustment) representing a state of the object after a second time period (time T1 to time T4), which is terminated after the first time period and is at least a part of the recognition period, in accordance with operation information obtained during the second time period. The second object processing means sequentially changes the state of the object after the second time period (after time T4) based on at least the second behavior information (S106 through S108). The display control means sequentially displays an image of the object on display means (2) in accordance with the state of the object.

In a second aspect, the second object processing means averages the state of the object based on the first behavior information and the state of the object based on the second behavior information, which are of an identical time point after the second time period, at a predetermined ratio (ratio), and gradually increases, along the passage of time, the ratio at which the state of the object based on the second behavior information contributes to the averaging so as to sequentially change the state of the object (time T4 to time T5).

In third and eleventh aspects, the first behavior information and the second behavior information each represent a position of the object in a virtual game world (TR1, TR2). The first object processing means and the second object processing means move the object to the position in the virtual game world represented by at least one of the first behavior information and the second behavior information.

In a fourth aspect, the first behavior information and the second behavior information each represent a predetermined series of motions (animation). The first object processing means causes the object to perform the series of motions represented by the first behavior information so as to change the state of the object. The second object processing means causes the object to perform the series of motions represented by the second behavior information so as to change the state of the object.

In fifth and twelfth aspects, the game apparatus further comprises determining means (S62, S65, S67, S78, S79, S93, S95, S103). The determining means determines that the input device has moved using the operation information to calculate a moving velocity of the input device (S103). The first time period, the second time period and the recognition period start when the determining means determines that the input device has moved (time T1). The first behavior setting means sets the first behavior information representing a position in the virtual game world to which the object is to move in accordance with a predetermined initial velocity (S91). The second behavior setting means sets the second behavior information representing a position in the virtual game world to which the object is to move in accordance with an initial velocity which is set based on the moving velocity of the input device calculated during the second time period.

In seventh and fourteenth aspects, the determining means further determines a rotation motion of the input device around a predetermined direction (Z axis) as a rotation axis using the operation information (S101, S102). The second behavior setting means sets a rotation (S) to be given to the object in accordance with the rotation motion (θ) of the input device determined during the second time period, and sets the second behavior information representing a position in the virtual game world to which the object given the rotation is to move.

In ninth and sixteenth aspects, the determining means further determines a posture of the input device before the input device moves using the operation information (S63). The first behavior setting means sets a direction in which the object is to move in accordance with the posture (UD) of the input device determined by the determining means, and sets the first behavior information representing a position in the virtual game world to which the object is to move in the direction.

In sixth, eighth, tenth, thirteenth, fifteenth, and seventeenth aspects, the game processing is for executing a game in which a player character (PC) hits a ball (BC) so as to cause the ball to fly in the virtual game world. The object is a ball object (BC) representing the ball moving in the virtual game world. The initial velocity set by each of the first behavior setting means and the second behavior setting means is a velocity of the ball object given when the player character hits the ball object in the virtual game world. The first behavior information and the second behavior information represent a trajectory in the virtual game world along which the ball object moves after being hit.

In an eighteenth aspect, the game processing is for executing a game in which a player character swings an item possessed by the player character to hit a ball so as to cause the ball to fly in the virtual game world. The game apparatus further comprises determining means. The determining means determines that the input device has moved using the operation information to determine at least a moving direction of the input device and a moving velocity of the input device. The object is a player object representing a player character. The first behavior setting means sets a series of motions of the player character swinging the item in a swinging direction in correspondence with the moving direction (leftward swing, rightward swing) of the input device which is determined during the first time period as the first behavior information. The second behavior setting means sets a series of motions of the player character swinging the item at a swinging velocity in correspondence with a moving velocity of the input device which is determined during the second time period in the swinging direction as the second behavior information.

In a nineteenth aspect, the input device includes an acceleration sensor (701) for detecting an acceleration generated in the input device. The operation information includes acceleration data (Da) which is output from the acceleration sensor in accordance with a motion of the input device.

In a twentieth aspect, the game apparatus further comprises determining means. The determining means determines that the input device is being swung using the operation information to determine at least a swinging direction of the input device. The recognition period and the second time period are from the time when the determining means determines that the input device is being swung until the time when the determining means determines that the input device finishes being swung. The first time period is from the time when the determining means determines that the input device is being swung until the time when the determining means determines the swinging direction of the input device.

A twenty-first aspect of the present embodiment is directed to a storage medium having stored thereon a game program executable by a computer (30) of a game apparatus for executing game processing of changing a state of an object in accordance with an input given to an input device. The game program causes the computer to execute a data obtaining step, a first behavior setting step, a first object processing step, a second behavior setting step, a second object processing step, and a display control step. The data obtaining step sequentially obtains operation information which is output in accordance with a motion of the input device and stores the operation information in a memory (33). The first behavior setting step sets first behavior information representing a state of the object after a first time period, which is a part of a recognition period for determining a motion of the input device, in accordance with operation information obtained during the first time period using operation information. The first object processing step sequentially changes the state of the object after the first time period based on the first behavior information. The second behavior setting step sets second behavior information representing a state of the object after a second time period, which is terminated after the first time period and is at least a part of the recognition period, in accordance with operation information obtained during second time period. The second object processing step sequentially changes the state of the object after the second time period based on at least the second behavior information. The display control step sequentially displays an image of the object on a display device in accordance with the state of the object.

In a twenty-second aspect, in the second object processing step, the state of the object based on the first behavior information and the state of the object based on the second behavior information, which are of an identical time point after the second time period, are averaged at a predetermined ratio, and the ratio at which the state of the object based on the second behavior information contributes to the averaging is gradually increased along the passage of time, so as to sequentially change the state of the object, so as to change the state of the object.

In twenty-third and thirty-first aspects, the first behavior information and the second behavior information each represent a position of the object in a virtual game world. In the first object processing step and the second object processing step, the object is moved to the position in the virtual game world represented by at least one of the first behavior information and the second behavior information.

In a twenty-fourth aspect, the first behavior information and the second behavior information each represent a predetermined series of motions. In the first object processing step, the object is caused to perform the series of motions represented by the first behavior information so as to change the state of the object. In the second object processing step, the object is caused to perform the series of motions represented by the second behavior information so as to change the state of the object.

In twenty-fifth and thirty-second aspects, the game program further causes the computer to execute a determining step. The determining step determines that the input device has moved using the operation information to calculate a moving velocity of the input device. The first time period, the second time period and the recognition period start when it is determined in the determining step that the input device has moved. In the first behavior setting step, the first behavior information representing a position in the virtual game world to which the object is to move is set in accordance with a predetermined initial velocity. In the second behavior setting step, the second behavior information representing a position in the virtual game world to which the object is to move is set in accordance with an initial velocity which is set based on the moving velocity of the input device determined during the second time period.

In twenty-seventh and thirty-fourth aspects, in the determining step, a rotation motion of the input device around a predetermined direction as a rotation axis is further calculated using the operation information. In the second behavior setting step, a rotation to be given to the object is set in accordance with the rotation motion of the input device determined during the second time period, and the second behavior information representing a position in the virtual game world to which the object given the rotation is to move is set.

In twenty-ninth and thirty-sixth aspects, in the determining step, a posture of the input device before the input device moves is further determined using the operation information. In the first behavior setting step, a direction in which the object is to move is set in accordance with the posture of the input device determined in the determining step, and the first behavior information representing a position in the virtual game world to which the object is to move in the direction is set.

In twenty-sixth, twenty-eighth, thirtieth, thirty-third, thirty-fifth, and thirty-seventh aspects, the game processing is for executing a game in which a player character hits a ball so as to cause the ball to fly in the virtual game world. The object is a ball object representing the ball moving in the virtual game world. The initial velocity set in each of the first behavior setting step and the second behavior setting step is a velocity of the ball object given when the player character hits the ball object in the virtual game world. The first behavior information and the second behavior information represent a trajectory in the virtual game world along which the ball object moves after being hit.

In a thirty-eighth aspect, the game processing is for executing a game in which a player character swings an item possessed by the player character to hit a ball so as to cause the ball to fly in the virtual game world. The game program further causes the computer to execute a determining step. The determining step determines that the input device has moved using the operation information to calculate at least a moving direction of the input device and a moving velocity of the input device. The object is a player object representing a player character. In the first behavior setting step, a series of motions of the player character swinging the item in a swinging direction in correspondence with the moving direction of the input device determined during the first time period is set as the first behavior information. In the second behavior setting step, a series of motions of the player character swinging the item at a swinging velocity in correspondence with a moving velocity of the input device determined during the second time period is set as the second behavior information.

In a thirty-ninth aspect, the input device includes an acceleration sensor for detecting an acceleration generated in the input device. The operation information includes acceleration data which is output from the acceleration sensor in accordance with a motion of the input device.

In a fortieth aspect, the game program further causes the computer to execute a determining step. The determining step determines that the input device is being swung using the operation information to calculate at least a swinging direction of the input device. The recognition period and the second time period are from the time when it is determined in the determining step that the input device is being swung until the time when it is determined in the determining step that the input device finishes being swung. The first time period is from the time when it is determined in the determining step that the input device is being swung until the time when it is determined in the determining step that the swinging direction of the input device.

According to the first aspect, in a game in which the player provides an operation input using the input device, the processing of reflecting the operation input on the state of the object starts in a part of the period for determining the operation input. Therefore, there is no delay with respect to the operation input, and the problem of the maneuverability being spoiled is solved. In addition, after the above-mentioned determining period is over, the processing of reflecting the operation input, obtained after the above-described processing, on the state of the game object is executed. Therefore, a real-time game performance is provided while accurately reflecting the operation input which is provided by the player.

According to the second aspect, the object can be gradually changed from the state based on the first behavior information to the state based on the second behavior information. Therefore, a real-time game performance can be provided naturally.

According to the third and eleventh aspects, the processing of moving the object in accordance with the operation input is executed while eliminating the delay with respect to the operation input. Therefore, a real-time game performance can be provided.

According to the fourth aspect, the processing of causing the object to perform a series of motions in accordance with the operation input while eliminating the delay with respect to the operation input. Therefore, a real-time game performance can be provided.

According to the fifth and twelfth aspects, the processing of reflecting the moving velocity of the input device on the state of the object is executed. Therefore, the operation input provided by the player can be accurately reflected in real time.

According to the seventh and fourteenth aspects, the processing of reflecting the rotation motion of the input device on the state of the object is executed. Therefore, the operation input provided by the player can be accurately reflected in real time.

According to the ninth and sixteenth aspects, the processing of reflecting the posture of the input device before the input device is moved on the state of the object is executed. Therefore, the operation input provided by the player can be accurately reflected in real time.

According to the sixth, eighth, tenth, thirteenth, fifteenth, and seventeenth aspects, in the case where a tennis game or the like of hitting a ball in a virtual game world is represented, a game performance of reflecting the operation input given by the player on the trajectory of the ball in real time can be provided.

According to the eighteenth aspect, in the case where a tennis game or the like of hitting a ball in a virtual game world is represented, a game performance of reflecting the operation input given by the player on the swing motion of the player character in real time can be provided.

According to the nineteenth aspect, the motion of the input device can be determined using linear acceleration data which is output from the acceleration sensor included in the input device.

According to the twentieth aspect, in a game in which the player provides an operation input using the input device, the processing of reflecting the operation input on the state of the object starts in the middle of the period for determining the operation input. Therefore, there is no delay with respect to the operation input, and the problem of the maneuverability being spoiled is solved. In addition, after the above-mentioned determining period is over, the processing of reflecting the operation input, obtained after the above-described processing, on the state of the game object is executed. Therefore, a real time game performance is provided while accurately reflecting the operation input which is provided by the player.

A storage medium having a game program according to the present embodiment stored thereon provides the same effects as those of the above-described game apparatus.

These and other, features, aspects and advantages of the present embodiment will become more apparent from the following detailed description of the present embodiment when taken in conjunction with the accompanying drawings.

BRIEF DESCRIPTION OF THE DRAWINGS

FIG. 25 shows exemplary behaviors determined in accordance with the spin parameter S;

FIG. 26 shows an example of a first ball trajectory TR1 and a second ball trajectory TR2.

DESCRIPTION OF THE PREFERRED EMBODIMENTS

Figure 1:
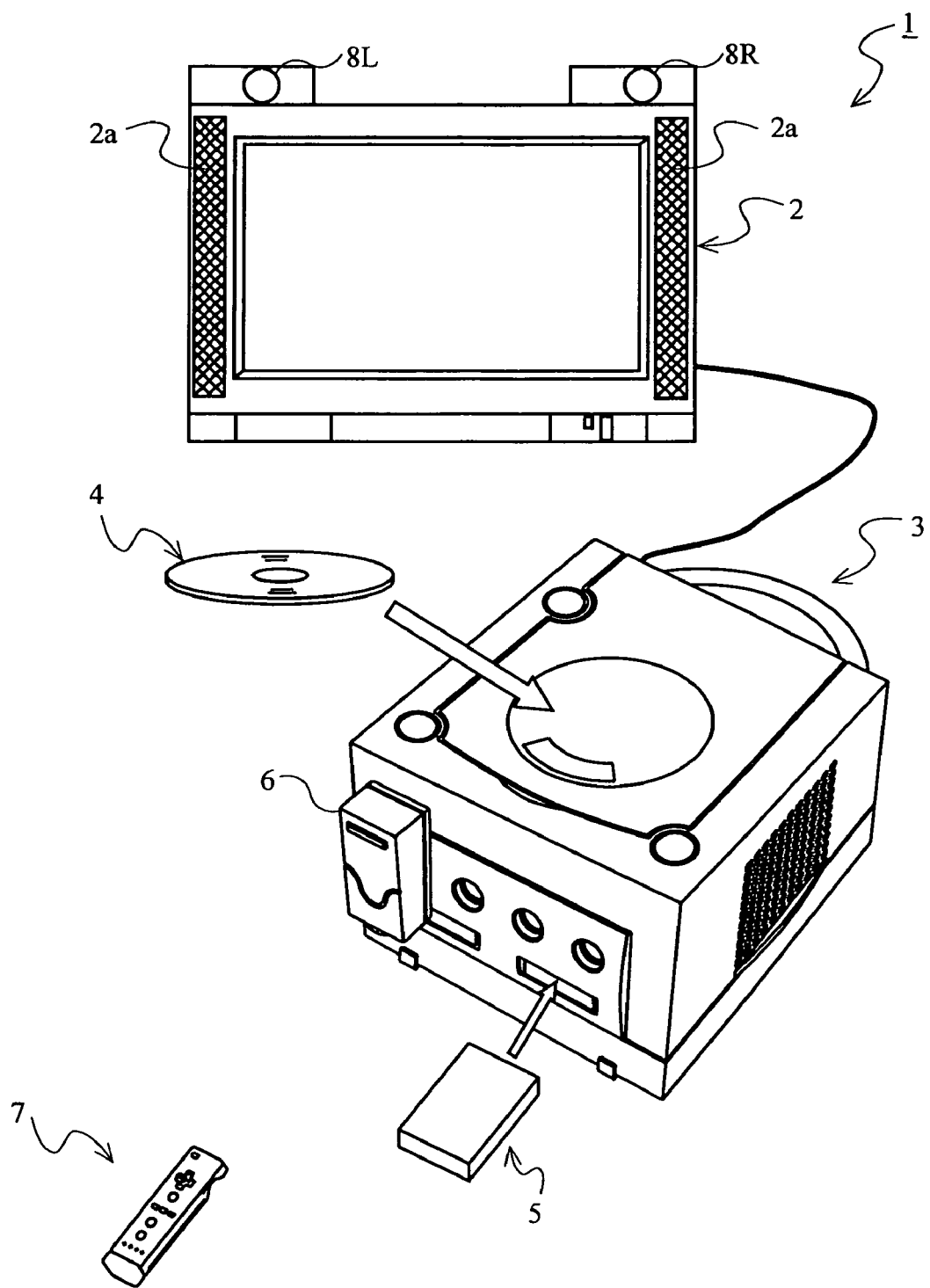
FIG. 1 is an external view of a game system 1 according to an embodiment.

With reference to FIG. 1, a game apparatus according to one embodiment will be described. Hereinafter, in order to give a specific description, a game system 1 using a game apparatus according to the present invention will be used as an example. FIG. 1 is an external view illustrating the game system 1. In the following description, the game system 1 includes an installation type game apparatus according to the present embodiment.

As shown in FIG. 1, the game system 1 includes an installation type game apparatus (hereinafter, referred to simply as a "game apparatus") 3, which is connected to a display (hereinafter, referred to as a "monitor") 2 including a speaker 2a of a home-use TV receiver or the like via a connection cord, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 includes a power ON/OFF switch, a game processing reset switch, and an OPEN switch for opening a top lid of the game apparatus 3 on a top main surface of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. A player playing with the game apparatus 3 can enjoy the game by operating the controller 7 while watching the game image displayed on the monitor 2.

The controller 7 wirelessly transmits the transmission data from a communication section 75 included therein (described later) to the game apparatus 3 connected to the receiving unit 6, using the technology of, for example, Bluetooth (registered trademark). The controller 7 is operation means for mainly operating a player object appearing in a game space displayed on the monitor 2. The controller 7 includes an operation section having a plurality of operation buttons, a key, a stick and the like. As described later in detail, the controller 7 also includes an imaging information calculation section 74 for taking an image viewed from the controller 7. As an example of an imaging subject of the imaging information calculation section 74, two LED modules (hereinafter, referred to as "markers") 8L and 8R are provided in the vicinity of a display screen of the monitor 2. The markers 8L and 8R each output infrared light forward from the monitor 2. In this embodiment, imaging information by the imaging information calculation section 74 is not used, and therefore the markers 8L and 8R are not absolutely necessary.

Figure 2:
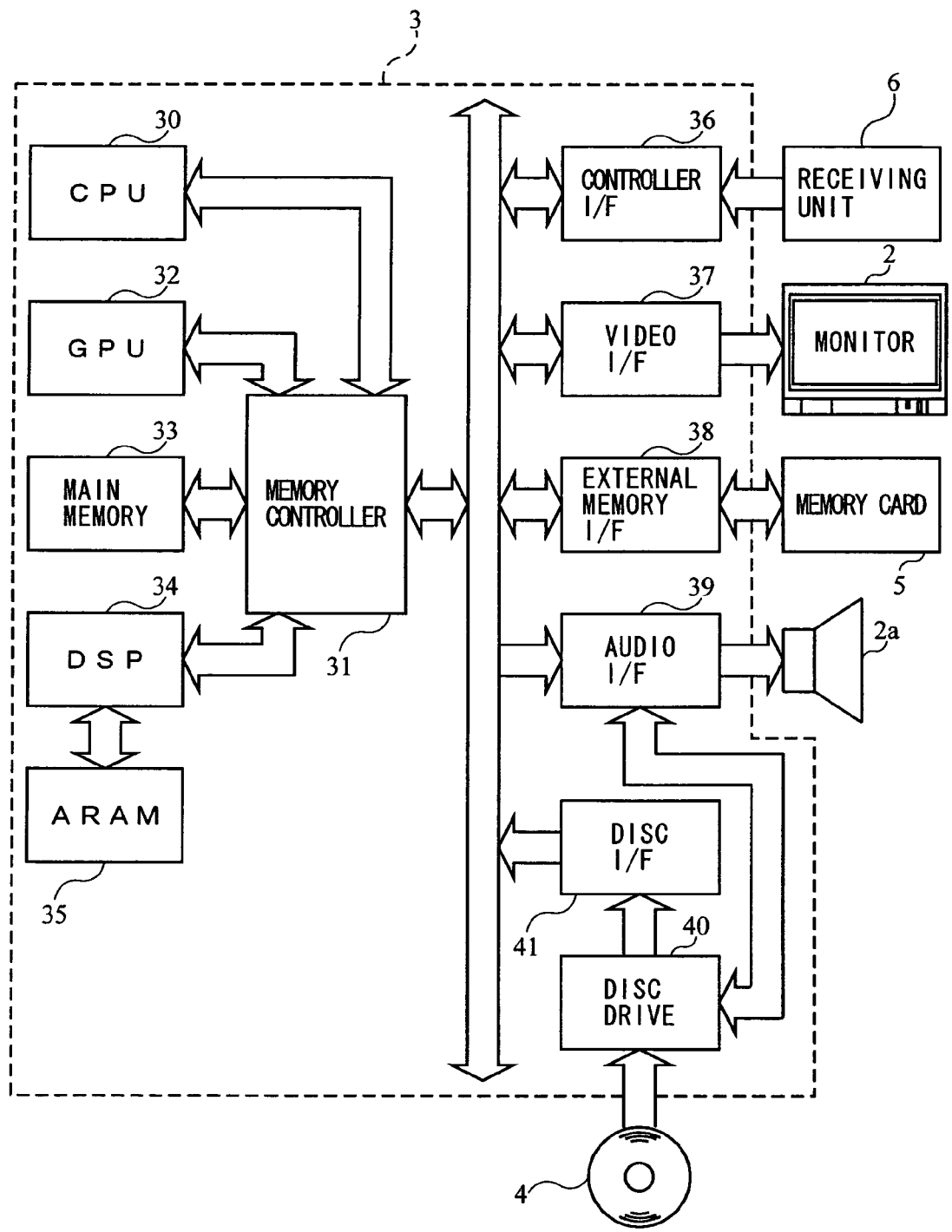
FIG. 2 is a functional block diagram of a game apparatus 3 shown in FIG. 1.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a start program stored in a boot ROM (not shown) to, for example, initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, and an ARAM (Audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to a receiving unit 6, the monitor 2, the external memory card 5, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data or the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (for example, storage of the game program or sound data already read). The DSP 34 reads the sound data stored in the ARAM 35 and outputs the sound data to the speaker 2a included in the monitor 2 via the memory controller 31 and the audio I/F 39.

The memory controller 31 comprehensively controls data transfer, and is connected to the various I/Fs described above. The controller I/F 36 includes, for example, four controllers I/F 36a through 36d, and communicably connects the game apparatus 3 to an external device which is engageable via connectors of the controller I/F 36a through 36d. For example, the receiving unit 6 is engaged with such a connector and is connected to the game apparatus 3 via the controller I/F 36. As described above, the receiving unit 6 receives the transmission data from the controller 7 and outputs the transmission data to the CPU 30 via the controller I/F 36. The video I/F 37 is connected to the monitor 2. The external memory I/F 38 is connected to the external memory card 5 and is accessible to a backup memory or the like provided in the external card 5. The audio I/F 39 is connected to the speaker 2a built in the monitor 2, and is connected such that the sound data read by the DSP 34 from the ARAM 35 or sound data directly output from the disc drive 40 is output from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 3:
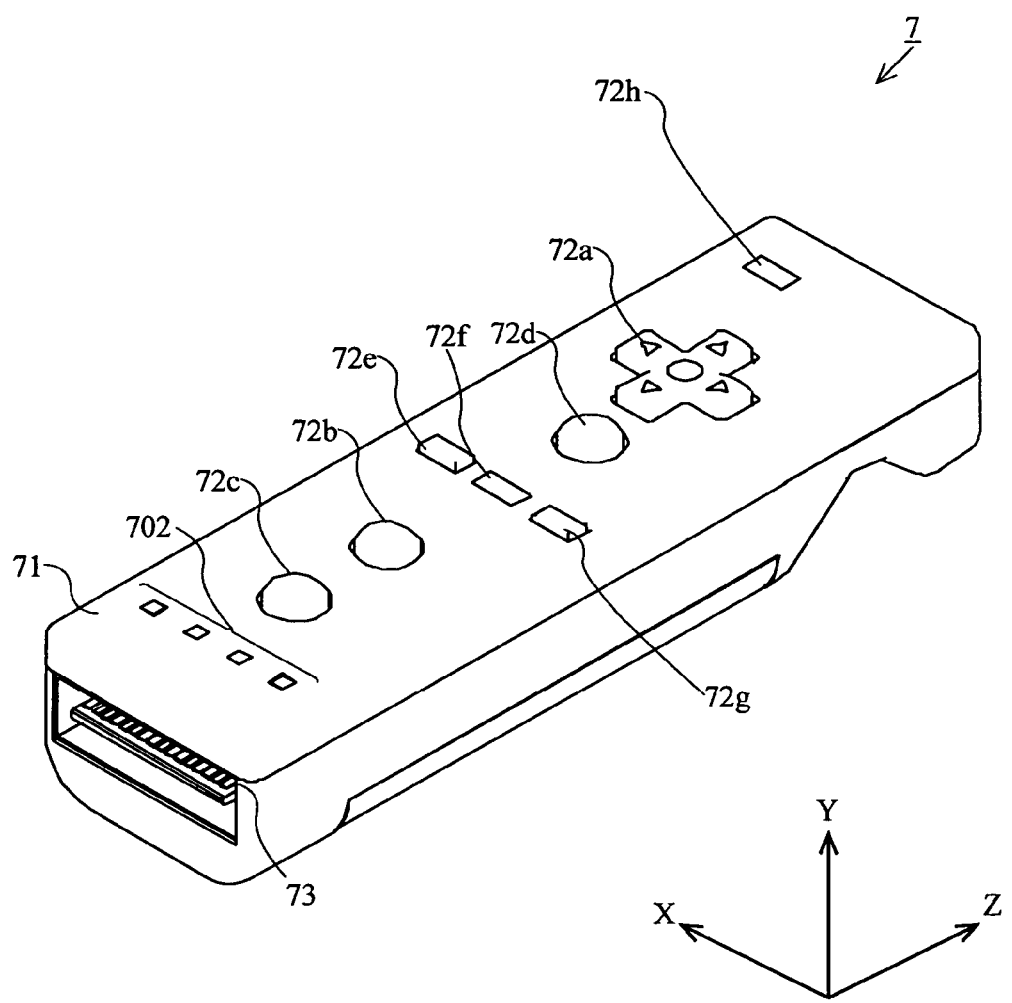
FIG. 3 is an isometric view of a controller 7 shown in FIG. 1 seen from the top rear side thereof.
Figure 4:
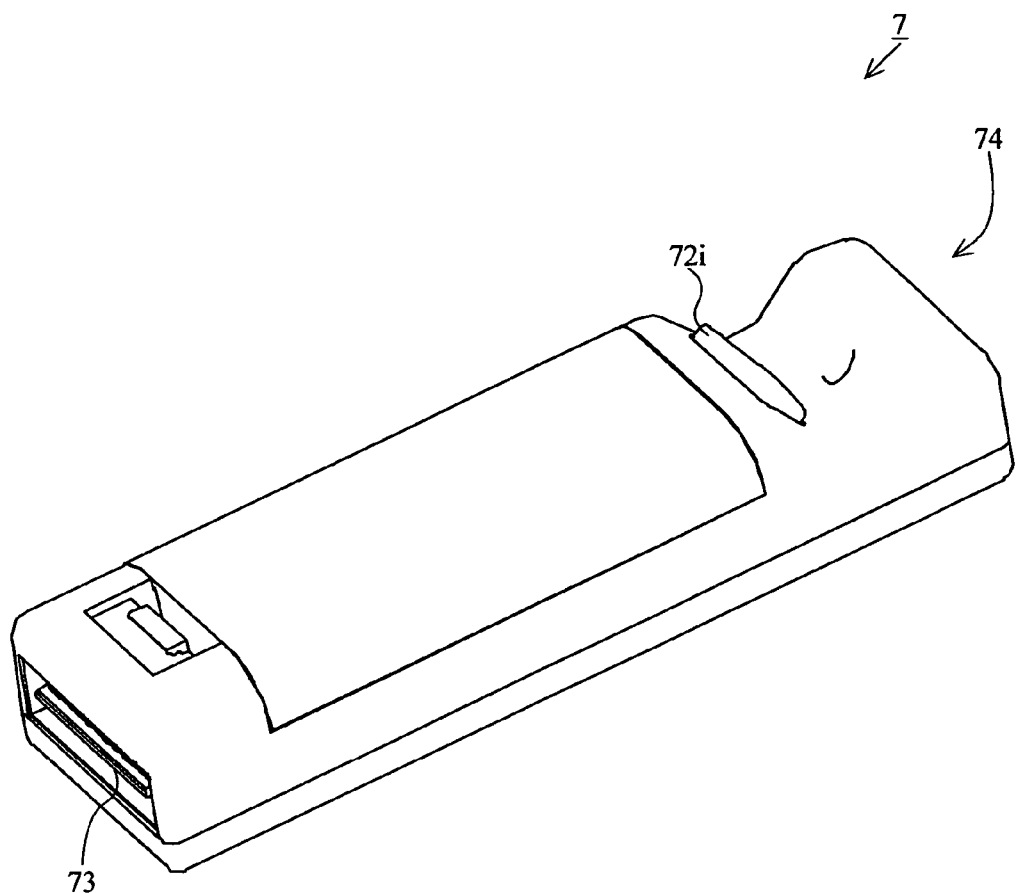
FIG. 4 is an isometric view of the controller 7 shown in FIG. 3 seen from the bottom rear side thereof.

With reference to FIG. 3 and FIG. 4, the controller 7 as an example of the input device according to the present invention will be described. FIG. 3 is an isometric view of the controller 7 seen from the top rear side thereof. FIG. 4 is an isometric view of the controller 7 seen from the bottom rear side thereof.

As shown in FIG. 3 and FIG. 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions represented by the arrows (front, rear, right and left), which are respectively located on cross-shaped projecting portions arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

The cross key 72a is an operation section for outputting an operation signal in accordance with the above-described direction input operation performed by the player, but such an operation section may be provided in another form. For example, the cross key 72a may be replaced with a composite switch including a push switch including ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the cross key 72a may be replaced with an operation section which includes switches representing at least four directions (front, rear, right and left) and outputs an operation signal in accordance with the switch pressed by the player.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of an X button, a Y button and a B button. The operation buttons 72e through 72g are assigned functions of a select switch, a menu switch and a start switch, for example. The operation buttons 72b through 72g are assigned various functions in accordance with the game program executed by the game apparatus 3, but this will not be described in detail because the functions are not directly relevant to the present invention. In an exemplary arrangement shown in FIG. 3, the operation buttons 72b through 72d are arranged in a line at the center in the front-rear direction on the top surface of the housing 71. The operation buttons 72e through 72g are arranged in a line in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he/she is using. Specifically, when the controller 7 transmits the transmission data to the receiving unit 6, one of the plurality of LEDs corresponding to the controller type is lit up.

On a bottom surface of the housing 71, a recessed portion is formed. As described later in detail, the recessed portion is formed at a position at which an index finger or middle finger of the player is located when the player holds the controller 7. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object.

On a front surface of the housing 71, an imaging element 743 (see FIG. 5B) included in the imaging information calculation section 74 is provided. The imaging information calculation section 74 is a system for analyzing image data taken by the controller 7 and determining the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. On a rear surface of the housing 71, a connector 73 is provided. The connector 73 is, for example, a 32-pin edge connector, and is used for engaging and connecting the controller 7 with a connection cable. The present invention can be realized without using information from the imaging information calculation section 74, and thus the imaging information calculation section 74 will not be described in further detail.

In order to give a specific description, a coordinate system which is set for the controller 7 will be defined. As shown in FIG. 3 and FIG. 4, X-, Y- and Z-axis directions perpendicular to one another are defined for the controller 7. Specifically, the longitudinal direction of the housing 71, i.e., the front-rear direction of the controller 7, is set as a Z-axis direction. A direction toward the front surface of the controller 7 (the surface having the imaging information calculation section 74) is set as a positive Z-axis direction. The up-to-down direction of the controller 7 is set as a Y-axis direction. A direction toward the top surface of the controller housing 71 (the surface having the cross key 72a and the like) is set as a positive Y-axis direction. The left-right direction of the controller 7 is set as an X-axis direction. A direction toward a left surface of the housing 71 (the surface which is not shown in FIG. 3 but is shown in FIG. 4) is set as a positive X-axis direction.

Figure 5A:
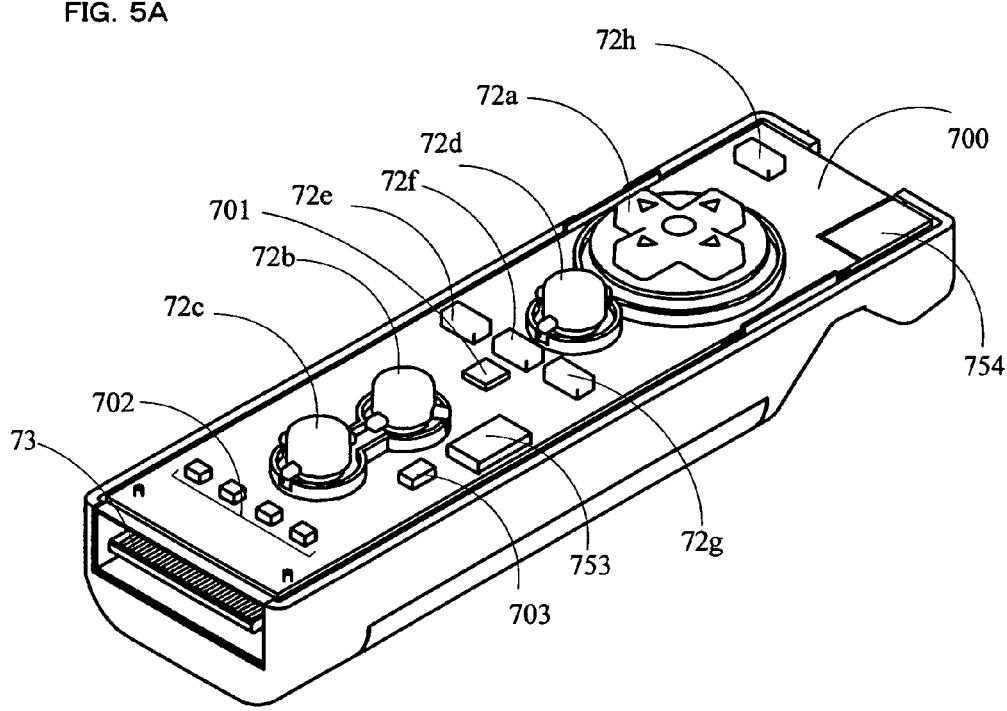
FIG. 5A is an isometric view of the controller 7 shown in FIG. 3 in the state where an upper casing is removed.
Figure 5B:
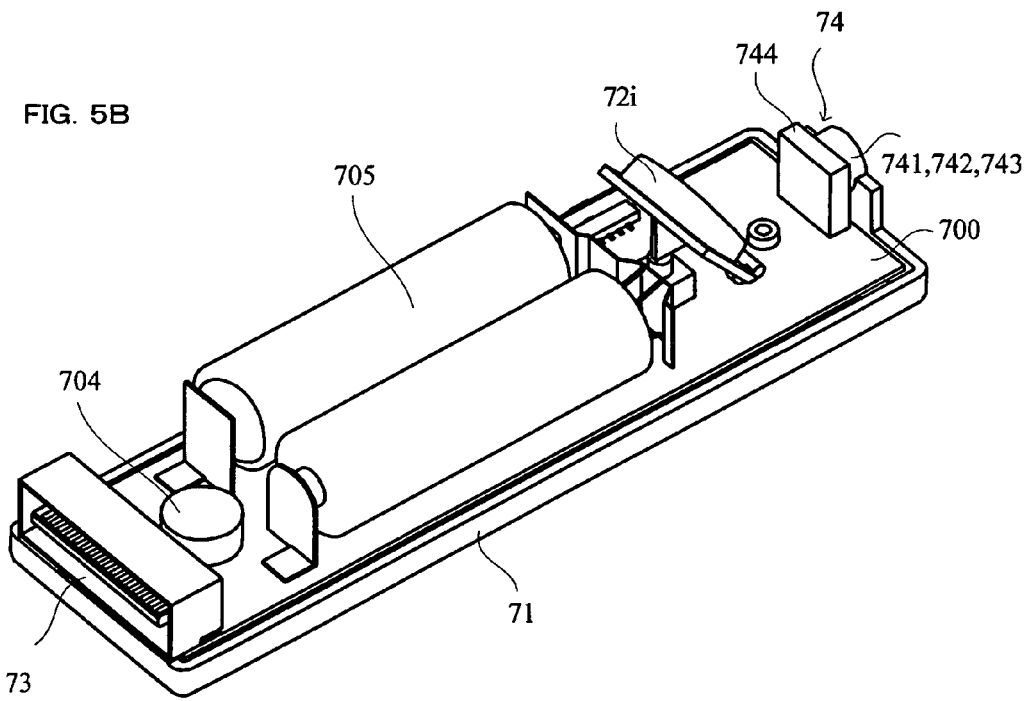
FIG. 5B is an isometric view of the controller 7 shown in FIG. 3 in the state where a lower casing is removed.

With reference to FIG. 5A and FIG. 5B, an internal structure of the controller 7 will be described. FIG. 5A is an isometric view illustrating a state where an upper casing (a part of the housing 71) of the controller 7 is removed. FIG. 5B is an isometric view illustrating a state where a lower casing (a part of the housing 71) of the controller 7 is removed. FIG. 5B shows a reverse side of a substrate 700 shown in FIG. 5A.

As shown in FIG. 5A, the substrate 700 is fixed inside the housing 71. On a top main surface of the substrate 700, the operation buttons 72a through 72h, an acceleration sensor 701, the LEDs 702, a quartz oscillator 703, a wireless module 753, an antenna 754 and the like are provided. These elements are connected to a microcomputer 751 (see FIG. 6) via lines (not shown) formed on the substrate 700 and the like. The acceleration sensor 701 detects and outputs acceleration, which can be used to calculate inclination, oscillation and the like in a three-dimensional space in which the controller 7 is located.

Figure 6:
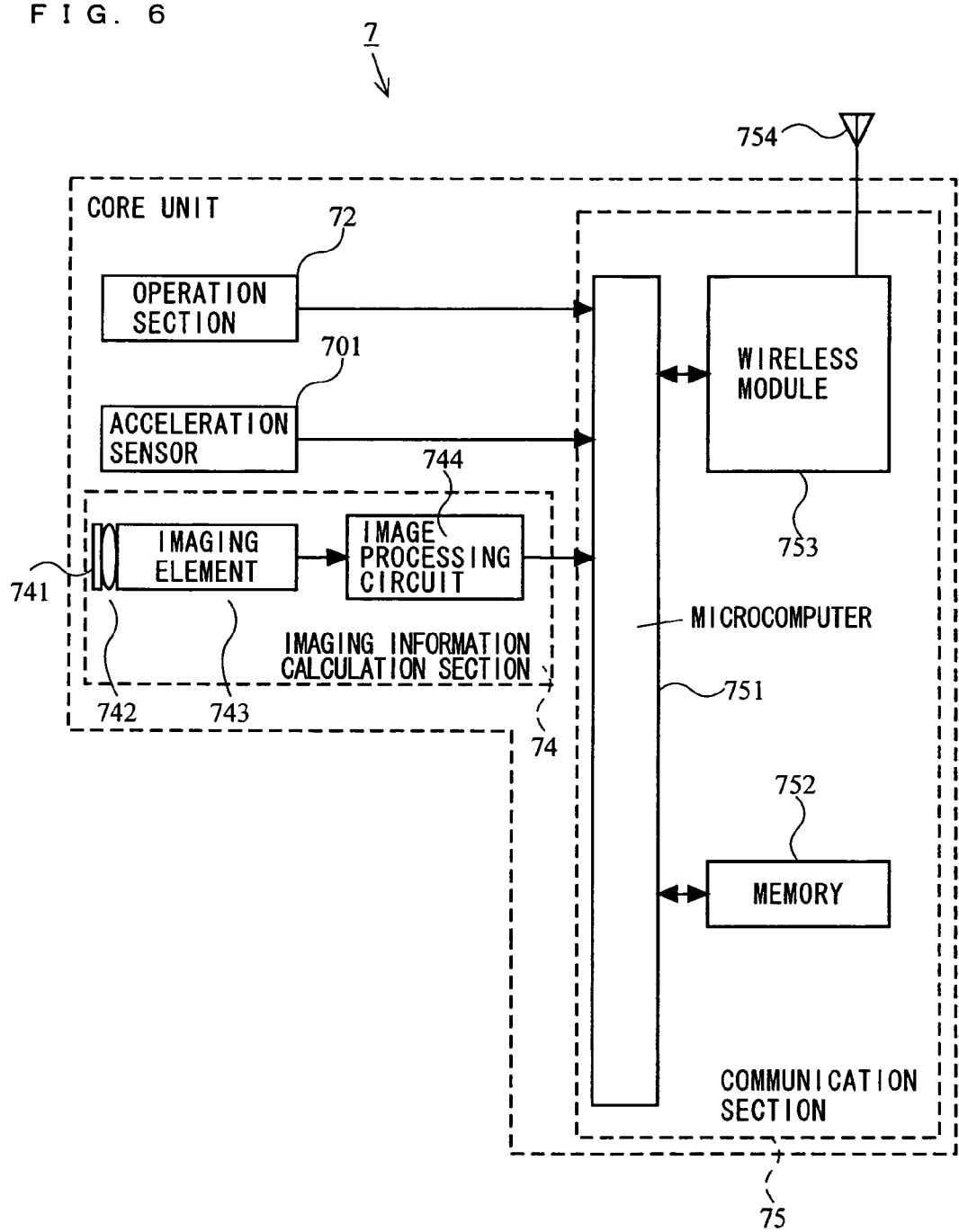
FIG. 6 is a block diagram illustrating a structure of the controller 7 shown in FIG. 3.

As shown in FIG. 6, the controller 7 preferably includes a three-axis, linear acceleration sensor 701 that detects linear acceleration in three directions, i.e., the up/down direction (Y-axis shown in FIG. 3), the left/right direction (X-axis shown in FIG. 3), and the forward/backward direction (Z-axis shown in FIG. 3). Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 701 may be of the type available from Analog Devices, Inc. or STMicroelectronics N.V. Preferably, the acceleration sensor 701 is an electrostatic capacitance or capacitance-coupling type that is based on silicon micromachined MEMS (microelectromechanical systems) technology. However, any other suitable accelerometer technology (e.g., piezoelectric type or piezoresistance type) now existing or later developed may be used to provide the three-axis or two-axis linear acceleration sensor 701.

As one skilled in the art understands, linear accelerometers, as used in acceleration sensor 701, are only capable of detecting acceleration along a straight line corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 701, additional information relating to the controller 7 can be inferred or calculated (i.e., determined), as one skilled in the art will readily understand from the description herein. For example, by detecting static, linear acceleration (i.e., gravity), the linear acceleration output of the acceleration sensor 701 can be used to determine tilt of the object relative to the gravity vector by correlating tilt angles with detected linear acceleration. In this way, the acceleration sensor 701 can be used in combination with the micro-computer 751 (or another processor) to determine tilt, attitude or position of the controller 7. Similarly, various movements and/or positions of the controller 7 can be calculated through processing of the linear acceleration signals generated by the acceleration sensor 701 when the controller 7 containing the acceleration sensor 701 is subjected to dynamic accelerations by, for example, the hand of a user, as will be explained in detail below. In another embodiment, the acceleration sensor 701 may include an embedded signal processor or other type of dedicated processor for performing any desired processing of the acceleration signals output from the accelerometers therein prior to outputting signals to micro-computer 751. For example, the embedded or dedicated processor could convert the detected acceleration signal to a corresponding tilt angle (or other desired parameter) when the acceleration sensor is intended to detect static acceleration (i.e., gravity).

The communication section 75 including the wireless module 753 and the antenna 754 allows the controller 7 to act as a wireless controller. The quartz oscillator 703 generates a reference clock of the microcomputer 751 described later.

As shown in FIG. 5B, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. The operation button 72i is attached on the bottom main surface of the substrate 700 rearward to the image information calculation section 74, and cells 705 are accommodated rearward to the operation button 72i. On the bottom main surface of the substrate 700 between the cells 705 and the connector 73, a vibrator 704 is attached. The vibrator 704 may be, for example, a vibration motor or a solenoid. The controller 7 is vibrated by an actuation of the vibrator 704, and the vibration is conveyed to the player holding the controller 7. Thus, a so-called vibration-responsive game is realized.

With reference to FIG. 6, the internal structure of the controller 7 will be described. FIG. 6 is a block diagram showing the structure of the controller 7.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 and generates image data. The image data generated by the imaging element 743 is processed by the image processing circuit 744. Specifically, the image processing circuit 744 processes the image data obtained from the imaging element 743, detects an area thereof having a high brightness, and outputs processing result data representing the detected coordinate position and size of the area to the communication section 75. The imaging information calculation section 74 is fixed to the housing 71 of the controller 7. The imaging direction of the imaging information calculation section 74 can be changed by changing the direction of the housing 71.

As described above, the acceleration sensor 701 detects and outputs the acceleration in the form of components of three axial directions of the controller 7, i.e., the components of the up-down direction (Y-axis direction), the left-right direction (X-axis direction), and the front-rear direction (the Z-axis direction) of the controller 7. Data representing the acceleration as the components of the three axial directions detected by the acceleration sensor 701 is output to the communication section 75. Based on the acceleration data which is output from the acceleration sensor 701, a motion of the controller 7 can be determined. As the acceleration sensor 701, a sensor for detecting an acceleration in two of the three axial directions may be used depending on the data needed for a particular application.

The communication section 75 includes the microcomputer 751, a memory 752, the wireless module 753 and the antenna 754. The microcomputer 751 controls the wireless module 753 for transmitting the transmission data while using the memory 752 as a storage area during processing.

Data from the controller 7 including an operation signal (key data) from the operation section 72, acceleration signals in the three axial directions (X-axis, Y-axis and Z-axis direction acceleration data) from the acceleration sensor 701, and the processing result data from the imaging information calculation section 74 are output to the microcomputer 751. The microcomputer 751 temporarily stores the input data (key data, X-axis, Y-axis and Z-axis direction acceleration data, and the processing result data) in the memory 752 as the transmission data which is to be transmitted to the receiving unit 6. The wireless transmission from the communication section 75 to the receiving unit 6 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the receiving unit 6, the microcomputer 751 outputs the transmission data stored in the memory 752 as a series of operation information to the wireless module 753. The wireless module 753 uses, for example, the Bluetooth (registered trademark) technology to radiate the operation information from the antenna 754 as a carrier wave signal of a predetermined frequency. Thus, the key data from the operation section 72, the X-axis, Y-axis and Z-axis direction acceleration data from the acceleration sensor 701, and the processing result data from the imaging information calculation section 74 are transmitted from the controller 7. The receiving unit 6 of the game apparatus 3 receives the carrier wave signal, and the game apparatus 3 demodulates or decodes the carrier wave signal to obtain the series of operation information (the key data, the X-axis, Y-axis and Z-axis direction acceleration data, and the processing result data). Based on the obtained operation information and the game program, the CPU 30 of the game apparatus 3 performs the game processing. In the case where the communication section 75 is structured using the Bluetooth (registered trademark) technology, the communication section 75 can have a function of receiving transmission data which is wirelessly transmitted from other devices.

Figure 7:
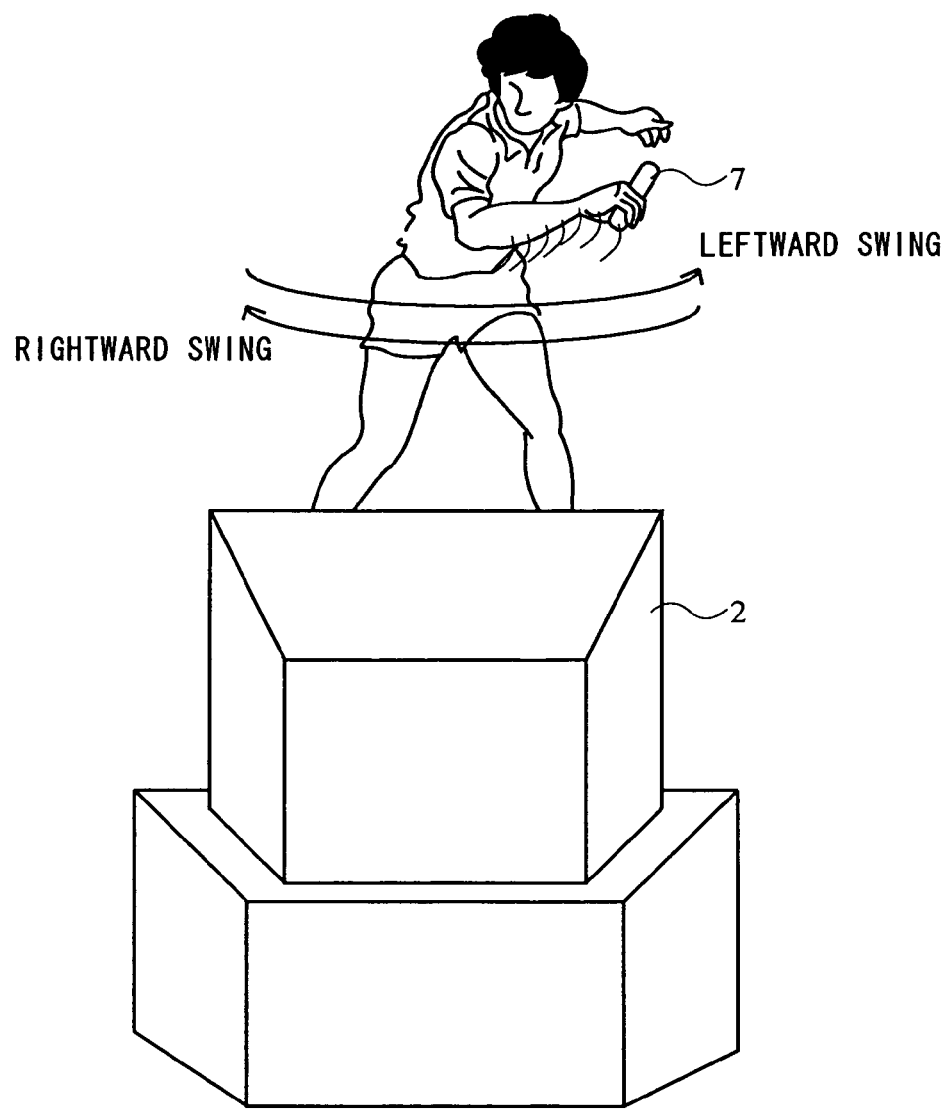
FIG. 7 shows how the controller 7 shown in FIG. 3 is used to perform a game operation.

Before describing specific processing performed by the game apparatus 3, an overview of a game played by the game apparatus 3 will be described. As shown in FIG. 7, the entire controller 7 is small enough to be held by one hand of an adult or even a child. In order to play the game with a game system 1 using the controller 7, the player holds the controller 7 with one hand (for example, right hand) such that the front surface of the controller 7 is directed forward. For example, the player holds the controller 7 with his/her thumb on the left surface thereof, with his/her palm on the top surface thereof, and with his/her index finger, middle finger, third finger and fourth finger on the bottom surface thereof, such that the front surface thereof is directed forward, i.e., away from himself/herself. The player holds the controller 7 as if he/she was holding a tennis racket.

The player swings his/her arm holding the controller 7 from his/her right to left (hereinafter, such a motion will be referred to as a "leftward swing" or swings his/her arm holding the controller 7 from his/her left to right (hereinafter, such a motion will be referred to as a "rightward swing") based on the game image displayed on the monitor 2. By such a swinging motion, the player gives operation information (for example, X-axis, Y-axis and Z-axis direction acceleration data) to the game apparatus 3 from the controller 7. In addition to the above-mentioned leftward swing and rightward swing, the player can, for example, perform a leftward swing or a rightward swing while swinging up the controller 7, swinging down the controller 7, or twisting the controller 7 left or right. By such a motion, the player can give various types of X-axis, Y-axis and Z-axis direction acceleration data to the game apparatus 3 from the controller 7. The present invention realizes a game of changing a state of a game object in accordance with an input given from the controller 7. Herein, the present invention will be described using a game, as an example, in which a state of a game object is changed using a shift of acceleration data in accordance with a motion of the controller 7. As an example of the input given from the controller 7, an act of the player of moving the controller 7 will be used.

Figure 8:
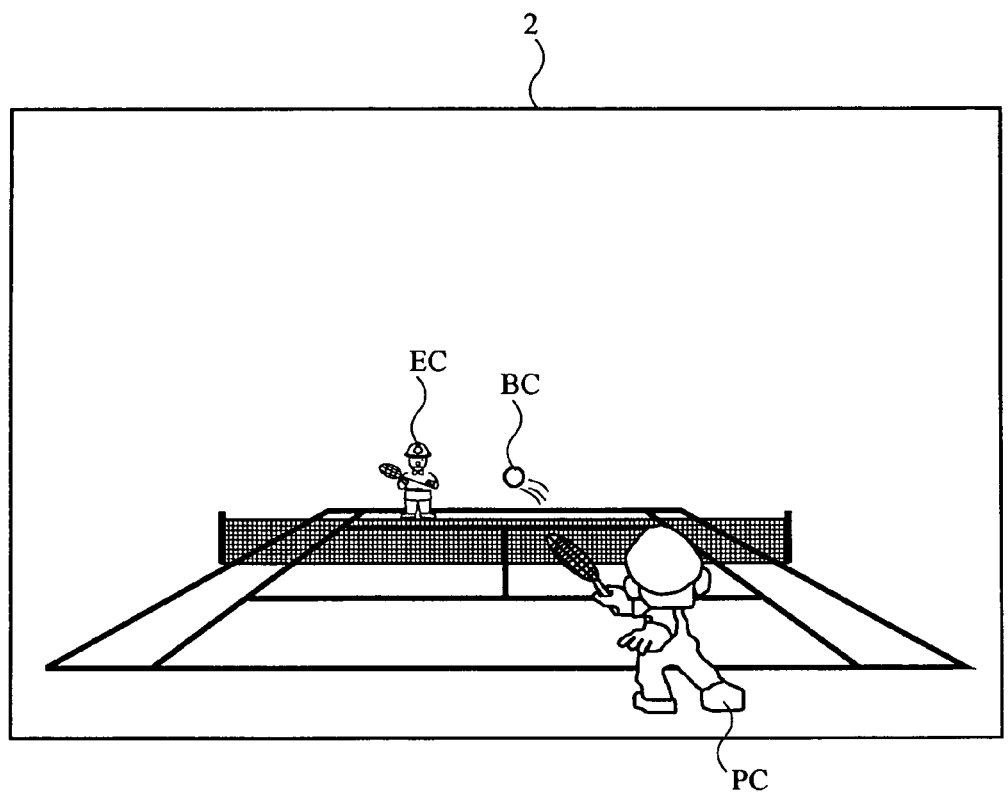
FIG. 8 shows an example of a tennis game image displayed on a monitor 2 in accordance with X-, Y- and Z-axis direction acceleration data received from the controller 7 shown in FIG. 3.
Figure 9A:
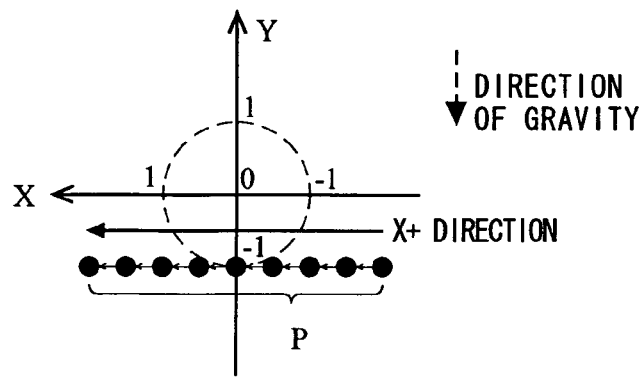
FIG. 9A through FIG. 9D are exemplary graphs, X and Y axes of which each represent whether an acceleration represented by each of the X- and Y-axis direction acceleration data is positive or negative as well as the magnitude of such an acceleration.
Figure 9B:
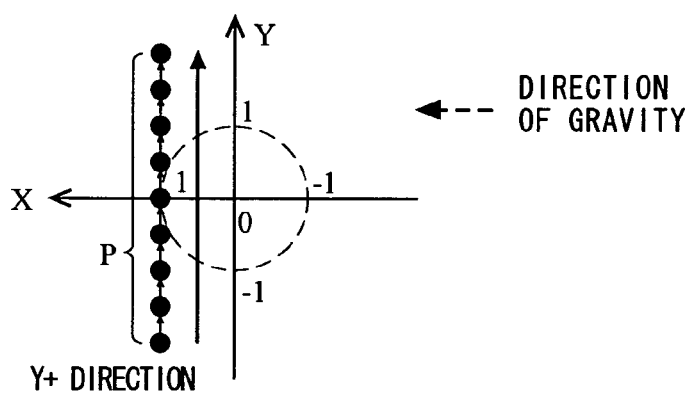
Figure 9C:
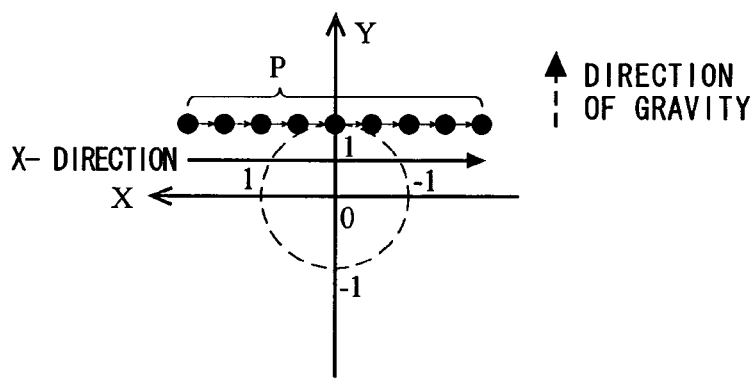
Figure 9D:
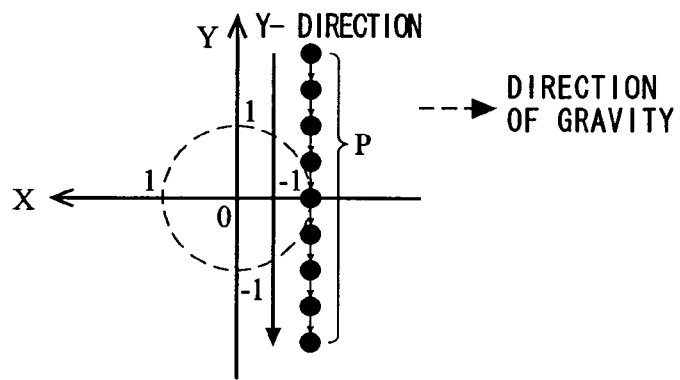

As shown in FIG. 8, a tennis game or the like is displayed on the monitor 2 in accordance with the X-axis, Y-axis and Z-axis direction acceleration data received from the controller 7. Specifically, a tennis court set in a virtual game space is displayed on the monitor 2 as a three-dimensional game image. In the virtual game space, a player character PC to be operated by the player, an opponent character EC acting as an opponent to the player character PC, a ball character BC representing a tennis ball moving on the tennis court, and the like are located. Such characters are displayed on the monitor 2. The player character PC and the ball character BC are objects of the present invention, the state of which is changed in accordance with an input given from the controller 7. Hereinafter, an example of game processing according to the present invention will be described. In order to give a specific description, it is assumed that a game program for the tennis game is stored on the optical disc 4 and that the CPU 30 reflects a motion of the controller 7 on an object (e.g., the player character PC, the ball character BC) during the tennis game processing.

The player character PC holds a tennis racket and is located on the tennis court which is set in the virtual game space. In accordance with a motion of the player of swinging the controller 7, an animation of the player character PC of swinging the tennis racket is displayed. When the player character PC hits back the ball character BC flying toward the player character PC with the tennis racket, the ball character BC hit by the tennis racket flies toward the court of the opponent character EC. Namely, by the player holding the controller 7 performing a motion of swinging the controller 7, the player character PC is displayed as performing a motion of swinging the tennis racket in a similar manner. The player can experience a virtual sports game as if he/she was playing tennis with a tennis racket.

In the case where the player character PC represents a right-handed tennis player, when the player performs a "leftward swing" of the controller 7, the player character PC swings the tennis racket forehand. When the player performs a "rightward swing" of the controller 7, the player character PC swings the tennis racket backhand. Namely, the player character PC swings the tennis racket in the same direction as the player swings the controller 7.

In accordance with the timing or velocity at which the player swings the controller 7, the flying direction or velocity of the ball character BC hit by the tennis racket swung by the player character PC changes. By the player performing a leftward swing or a rightward swing while swinging up or swinging down the controller 7, the height of the flying trajectory of the ball character BC changes. By the player performing a leftward swing or a rightward swing while twisting the controller 7 left or right, the player character PC can be displayed as hitting back the ball character BC with a so-called topspin or backspin toward the opponent character EC. As described later in detail, such motions can be distinguished and determined by using the X-axis, Y-axis and Z-axis direction acceleration data which is output from the controller 7. In this manner, a tennis game reflecting various motions given by the player to the controller 7 can be represented.

Now, a method for determining whether or not the controller 7 is being swung will be described. When the Z-axis direction acceleration data represents a positive Z-axis direction value exceeding a threshold value, the game apparatus 3 determines that the player is swinging the controller 7. For example, when the controller 7 is in a still state, the acceleration sensor 701 never detects an acceleration exceeding the acceleration of gravity of 9.8 m/s$^2$. When the player holding the controller 7 swings his/her arm as described above, the front edge of the controller 7 moves in an arc-shaped trajectory. Therefore, the acceleration in the positive Z-axis direction (see FIG. 3) is detected by the influence of the centrifugal force. In this embodiment, a threshold value equal to or greater than the acceleration of gravity is set, and when the Z-axis direction acceleration data represents an acceleration exceeding the threshold value, it is determined that the player is swinging the controller 7.

With reference to FIG. 9A through FIG. 9D, when it is determined that the player is swinging the controller 7, a direction in which the player is swinging the controller 7 (swinging direction) is determined by a method described below using the X- and Y-axis direction acceleration data. FIG. 9A through FIG. 9D are exemplary graphs, X and Y axes of which each represent whether an acceleration represented by each of the X- and Y-axis direction acceleration data is positive or negative as well as the magnitude of such an acceleration. The accelerations represented by the X- and Y-axis direction acceleration data simultaneously obtained at a predetermined time interval (for example, every 5 ms) are sequentially plotted in the X-Y coordinate system. In FIG. 9A through FIG. 9D, points P represent the accelerations represented by the X- and Y-axis direction acceleration data simultaneously obtained. The arrow beside the points P represents the order in which the data is obtained. The origin ((X, Y)=(0, 0)) represents the value of the acceleration data in the state where no acceleration including the acceleration of gravity acts upon the acceleration sensor 701. The numerical value "1" (corresponding to the position indicated by the dashed circle) represents the magnitude of the acceleration of gravity.

When the player swings the controller 7, the controller 7 is accelerated at the start of the swing and decelerated at the end of the swing. Accordingly, at the start of the swing, the controller 7 is provided with an acceleration in the same direction as the swing. Then, the magnitude of the acceleration gradually decreases. At the end of the swing, the controller 7 is provided with an acceleration in the opposite direction to the swing. In general, an acceleration vector (or information on whether the acceleration is positive or negative) which is output from the acceleration sensor 701 is exactly opposite to the acceleration direction of the controller 7. Accordingly, at the start of the swing, the acceleration sensor 701 detects an acceleration in the opposite direction to the swing. Then, the magnitude of the acceleration gradually decreases. At the end of the swing, the acceleration sensor 701 detects an acceleration in the same direction as the swing.

For example, when the controller 7 is accelerated in a horizontal leftward swing with the top surface thereof directed upward (i.e., when the acceleration direction of the controller 7 is the positive X-axis direction), the acceleration sensor 701 provides an acceleration vector in a negative X-axis direction. In the X-Y coordinate system in which the accelerations represented by the X- and Y-axis direction data simultaneously obtained during the swing are plotted, the accelerations show a negative value in the X-axis direction at the start of the swing because the controller 7 is accelerated. Toward the end of the swing, the accelerations are plotted in the positive X-axis direction because the controller 7 is decelerated. In addition, the acceleration sensor 701 is constantly acted upon by the acceleration of gravity. Therefore, the acceleration sensor 701 detects an acceleration of magnitude "1" in a vertical direction (in this case, in a negative Y-axis direction). Accordingly, when the player performs a horizontal leftward swing of the controller 7 with the top surface thereof directed upward, points P are sequentially plotted from a negative value to a positive value in the X-axis direction (in the X+ direction) with the value in the Y-axis direction fixed at "−1" (see FIG. 9A).

When the controller 7 is accelerated in a horizontal leftward swing with the top surface thereof directed at 90 degrees leftward with respect to the player (i.e., when the acceleration direction of the controller 7 is the positive Y-axis direction), the acceleration sensor 701 provides an acceleration vector in the negative Y-axis direction. In the X-Y coordinate system in which the accelerations represented by the X- and Y-axis direction data simultaneously obtained during the swing are plotted, the accelerations show a negative value in the Y-axis direction at the start of the swing because the controller 7 is accelerated. Toward the end of the swing, the accelerations are plotted in the positive Y-axis direction because the controller 7 is decelerated. In addition, the acceleration sensor 701 is constantly acted upon by the acceleration of gravity. Therefore, the acceleration sensor 701 detects an acceleration of magnitude "1" in the vertical direction (in this case, in the positive X-axis direction). Accordingly, when the player performs a horizontal leftward swing of the controller 7 with the top surface thereof directed at 90 degrees leftward with respect to the player, points P are sequentially plotted from a negative value to a positive value in the Y-axis direction (in the Y+ direction) with the value in the X-axis direction fixed at "+1" (see FIG. 9B).

When the controller 7 is accelerated in a horizontal leftward swing with the top surface thereof directed downward (i.e. when the acceleration direction of the controller 7 is the negative X-axis direction), the acceleration sensor 701 provides an acceleration vector in the positive X-axis direction. In the X-Y coordinate system in which the accelerations represented by the X- and Y-axis direction data simultaneously obtained during the swing are plotted, the accelerations shows a positive value in the X-axis direction at the start of the swing because the controller 7 is accelerated. Toward the end of the swing, the accelerations are plotted in the negative X-axis direction because the controller 7 is decelerated. In addition, the acceleration sensor 701 is constantly acted upon by the acceleration of gravity. Therefore, the acceleration sensor 701 detects an acceleration of magnitude "1" in the vertical direction (in this case, in the positive Y-axis direction). Accordingly, when the player performs a horizontal leftward swing of the controller 7 with the top surface thereof directed downward, points P are sequentially plotted from a positive value to a negative value in the X-axis direction (in the X− direction) with the value in the Y-axis direction fixed at "+1" (see FIG. 9C).

When the controller 7 is accelerated in a horizontal leftward swing with the top surface thereof directed at 90 degrees rightward with respect to the player (i.e., when the acceleration direction of the controller 7 is the negative Y-axis direction), the acceleration sensor 701 provides an acceleration vector in the positive Y-axis direction. In the X-Y coordinate system in which the accelerations represented by the X- and Y-axis direction data simultaneously obtained during the swing are plotted, the accelerations show a positive value in the Y-axis direction at the start of the swing because the controller 7 is accelerated. Toward the end of the swing, the accelerations are plotted in the negative Y-axis direction because the controller 7 is decelerated. In addition, the acceleration sensor 701 is constantly acted upon by the acceleration of gravity. Therefore, the acceleration sensor 701 detects an acceleration of magnitude "1" in the vertical direction (in this case, in the negative X-axis direction). Accordingly, when the player performs a horizontal leftward swing of the controller 7 with the top surface thereof directed at 90 degrees rightward with respect to the player, points P are sequentially plotted from a positive value to a negative value in the Y-axis direction (in the Y– direction) with the value in the X-axis direction fixed at "–1" (see FIG. 9D).

As described above, when the player performs a leftward swing of the controller 7, a direction in which the acceleration obtained from the X- and Y-axis direction acceleration data shifts (shifting direction) varies in accordance with the direction of the controller 7 held by the player. However, as is clear from FIG. 9A through FIG. 9D, when the player performs a leftward swing of the controller 7, the points P are all plotted clockwise around the origin of the X-Y coordinate system. It is clear that when the player performs a rightward swing of the controller 7, the shifting direction of acceleration is opposite; i.e., the points P are all plotted counterclockwise around the origin of the X-Y coordinate system. This means that by calculating the direction in which the points P are circulated with respect to the origin of the X-Y coordinate system (circulation direction of the points P), the swinging direction of the controller 7 provided by the player (moving direction of the controller 7) can be determined. The relationship between the circulation direction of the points P and the swinging direction of the controller 7 varies in accordance with the setting of the coordinate axes, the characteristics of the acceleration sensor, the setting of the X-Y coordinate system and the like, and may be adjusted in accordance with such settings as necessary. Specifically, the swinging direction of the controller 7 can be accurately determined by analyzing the shifting direction of the acceleration data with respect to the direction of acceleration of gravity based on the obtained acceleration data (represented by the dashed arrow in FIG. 9A through FIG. 9D).

Figure 10:
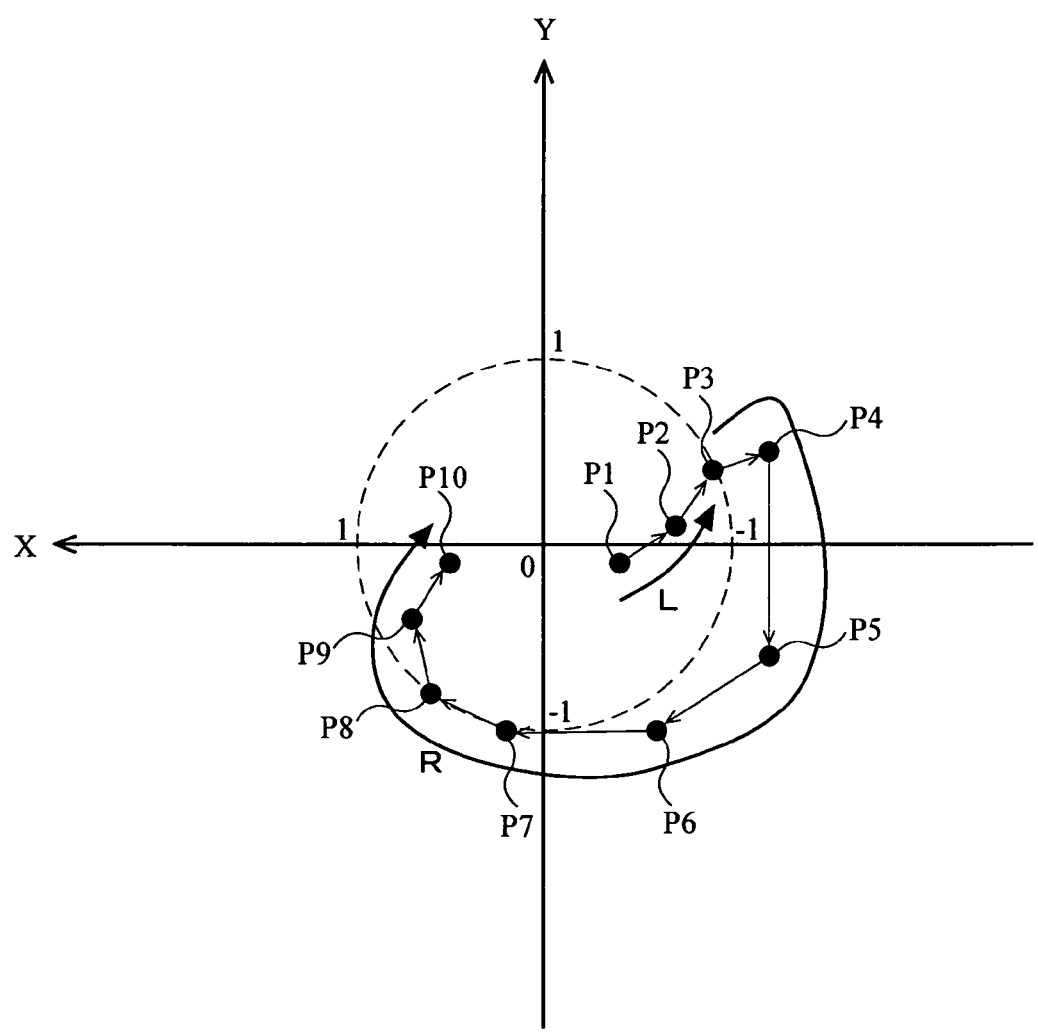
FIG. 10 is an example of a shift of acceleration data obtained in one of FIG. 9A through FIG. 9D by a leftward swing.

In actuality, however, the points P plotted in the X-Y coordinate system draw a complicated curve as shown in FIG. 10 by the influence of a backswing performed by the player before swinging the controller 7 as intended, a twist, or the like. FIG. 10 shows an example of the plotted points P obtained when the player performs a leftward swing. At the start of the swing, the plotted points P show a counterclockwise shift (points P1 through P3; shift L) and then show a clockwise shift (points P3 through P10; shift R). If the swinging direction of the controller 7 is determined in the middle of shift L, the swinging direction is determined as rightward. Shift L is a data group having a relatively small magnitude of acceleration. This is because the backswing is weak. Shift L is almost radial from the origin of the X-Y coordinate system. This is because the controller 7 is swung in a different direction from the leftward swing or the rightward swing. Such a data group having a relatively small magnitude of acceleration and showing a shift which is almost radial from the origin of the X-Y coordinate system is considered to have a low reliability for determining the swinging direction. The swinging direction can be accurately determined by using a data group having a relatively large magnitude of acceleration and showing a shift which is close to a circle around the origin of the X-Y coordinate system, for example, shift R. In other words, in order to determine the swinging direction, data having a larger magnitude of acceleration and data showing a shift which is closer to a circle around the origin of the X-Y coordinate system is more reliable.

Figure 11:
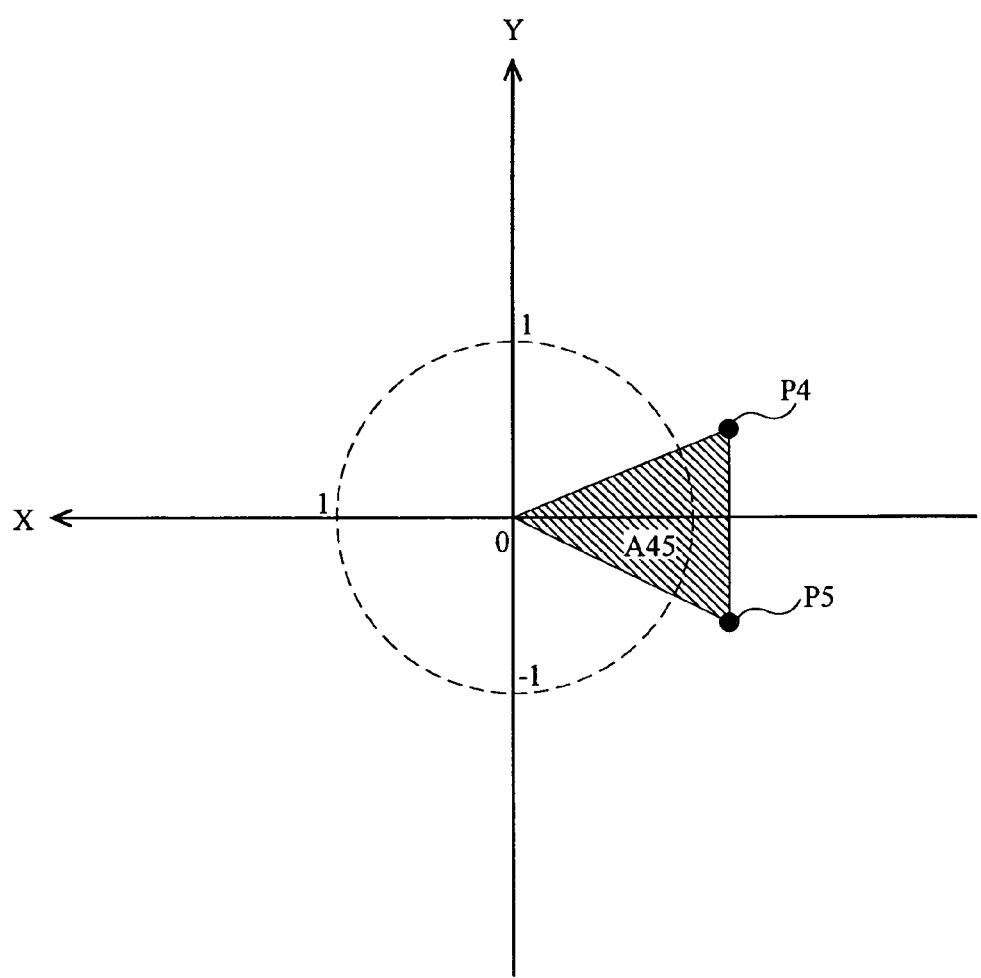
FIG. 11 shows a triangle area A45 defined by straight lines connecting points P4 and P5 which are continuous in a time series manner and the origin shown in FIG. 10.

The above-described reliability is represented by an area of a triangle defined by two pieces of acceleration data which are continuous in a time series manner and the origin of the X-Y coordinate system. For example, as shown in FIG. 11, a triangle area A45 defined by straight lines connecting points P4 and P5 which are continuous in a time series manner and the origin is used. Where the points P represent a larger magnitude of acceleration, the triangle area A45 is larger. Where the points P show a shift closer to a circle around the origin, the triangle area A45 is larger. In this manner, the reliability can be represented by the triangle area A45.

Figure 12:
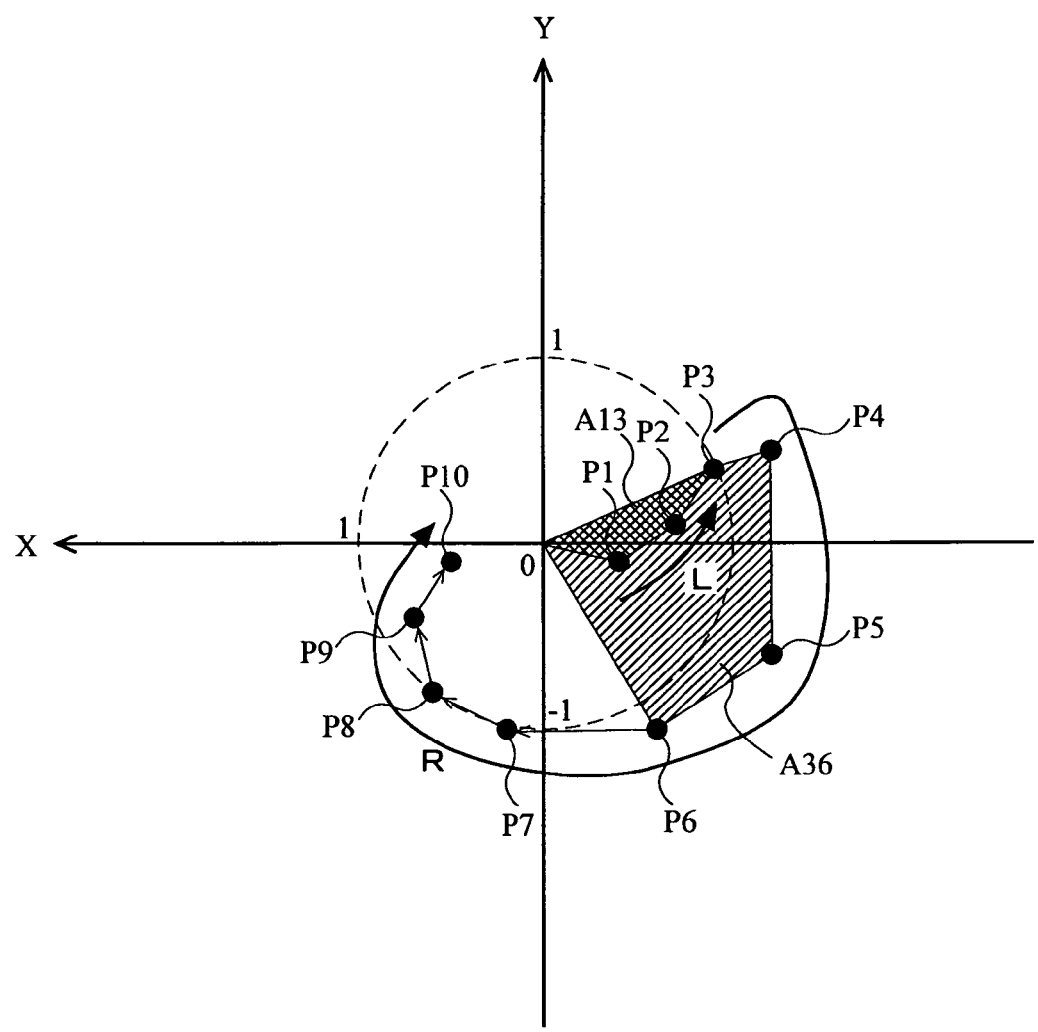
FIG. 12 shows an area A13 obtained by accumulating triangles defined by points P1 through P3 which are continuous in a time series manner and the origin shown in FIG. 10 and an area A36 obtained by accumulating triangles defined by points P3 through P6 which are continuous in a time series manner and the origin shown in FIG. 10.

FIG. 12 shows an area A13 of a region relating to points P1 through P3 shown in FIG. 10 which are continuous in a time series manner, and an area A36 of a region relating to points P3 through P6 shown in FIG. 10 which are continuous in a time series manner. More specifically, the region having the area A13 is obtained by accumulating triangles each defined by the origin and two adjacent points among points P1 through P3. The region having the area A36 is obtained by accumulating triangles each defined by the origin and two adjacent points among points P3 through P6. The area A13 overlaps a part of the area A36. As shown in FIG. 12, the area A13 is an accumulated area of the triangles calculated using the points P1 through P3 representing a counterclockwise shift with respect to the origin. The area A36 is an accumulated area of the triangles calculated using the points P3 through P6 representing a clockwise shift with respect to the origin. As is clear from FIG. 12, the area A13 is significantly smaller than the area A36. In this embodiment, the areas of triangles defined by the points P representing a clockwise shift and the areas of triangles defined by the points P representing a counterclockwise shift are each accumulated in a time series manner. When one of the accumulated values exceeds a threshold value, the swinging direction of the controller 7 is determined based on whether the points P defining the triangles used for forming the exceeding accumulated value show a clockwise shift or a counterclockwise shift. In this manner, the swinging direction can be accurately determined by while eliminating the influence of the data having a low reliability. It is considered that the swinging direction can be determined more accurately by analyzing all the points P from the start until the end of the swing. In this embodiment, the threshold value is used in order to determine the swinging direction at an earlier stage of the swinging motion. Namely, the swinging direction is determined before the player finishes swinging the controller 7 (in the middle of motion recognition processing). A first time period of the present invention is from the time when the controller 7 is determined to have been swung until the time when the swinging direction of the controller 7 is determined.

Now, a velocity at which the player swings the controller 7 (swinging velocity) is determined as follows. When the player swings the controller 7 at a high velocity, the time period from the acceleration to the deceleration is relatively short. When the player swings the controller 7 at a low velocity, the time period from the acceleration to the deceleration is relatively long. Where the player swings the controller 7 with the same length of stroke, the interval between the points P plotted in the X-Y coordinate system (hereinafter, occasionally referred to as a "data interval") is larger as the player swings the controller 7 at a higher velocity. Accordingly, the swinging velocity of the controller 7 provided by the player can be calculated by determining the interval between the points P which are continuous in a time series manner. In this embodiment, all the points P from the start until the end of the swing are analyzed, and the points P having the largest interval therebetween, among the intervals between points P which are continuous in a time series manner, are extracted. Thus, the swinging velocity is calculated.

Figure 13:
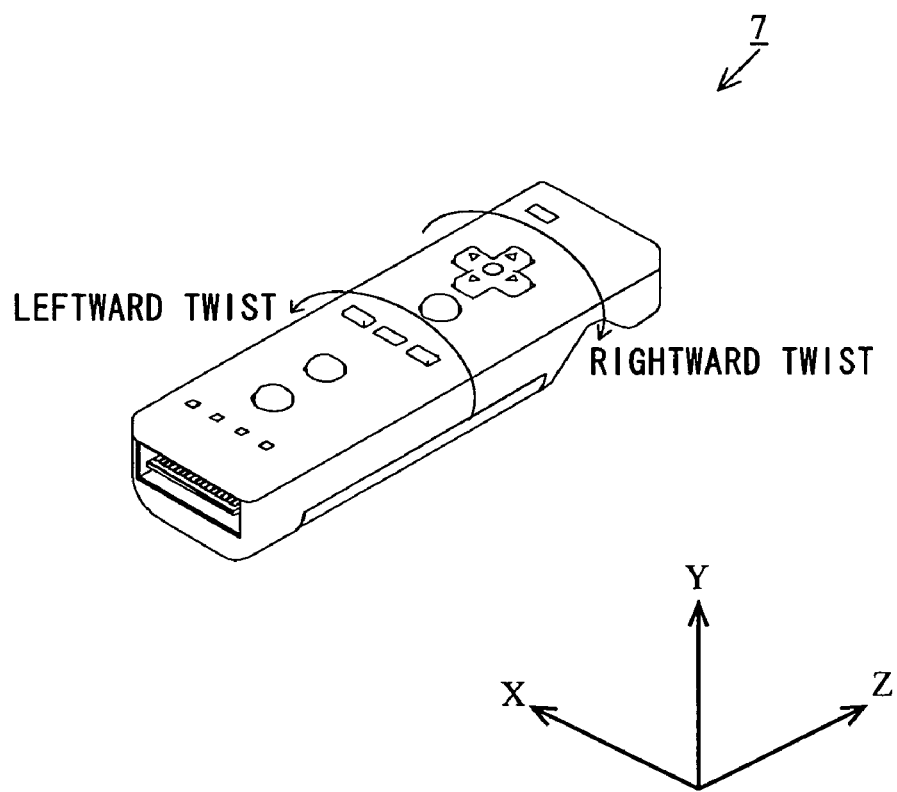
FIG. 13 is an isometric view of the controller 7 shown in FIG. 3 illustrating twisting directions thereof.
Figure 14A:
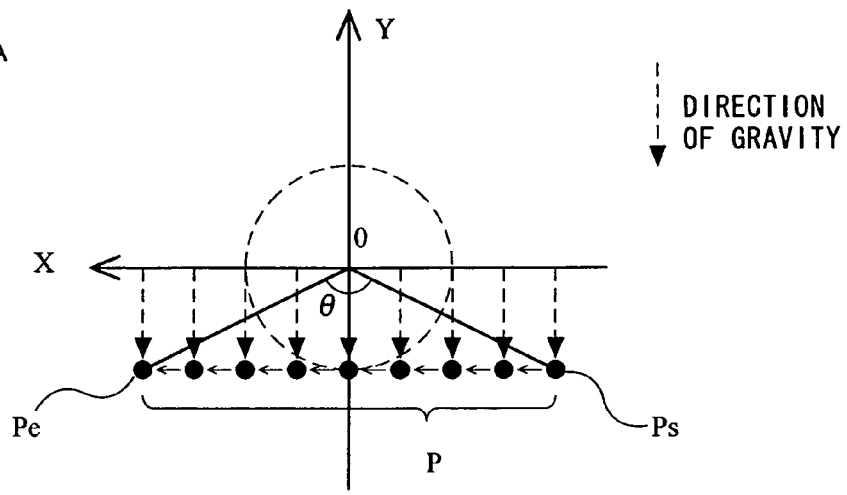
FIG. 14A through FIG. 14C are graphs each illustrating an example of values of acceleration represented by each of the X- and Y-axis direction acceleration data in accordance with the twist given to the controller 7.
Figure 14B:
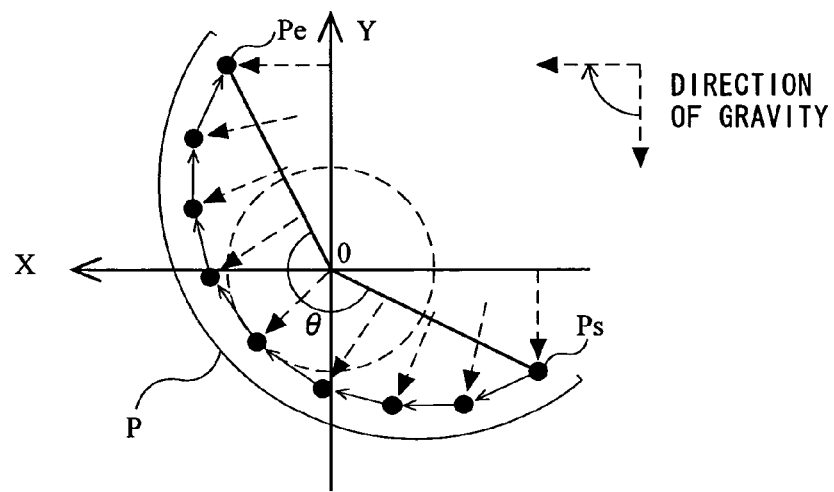
Figure 14C:
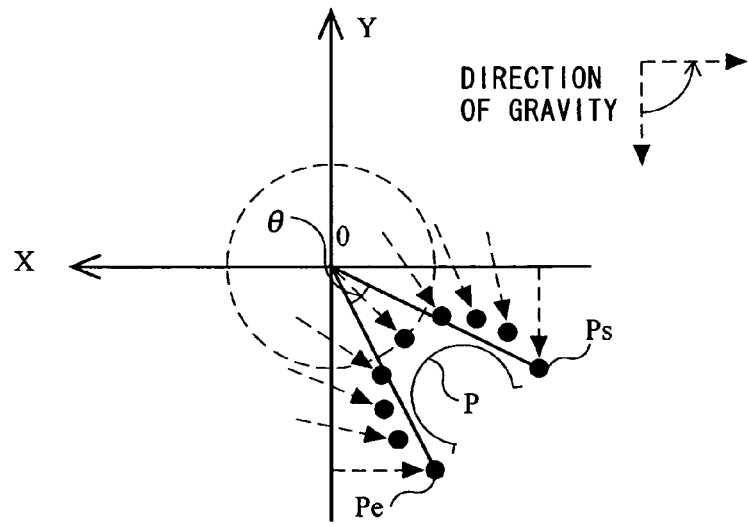
Figure 15:
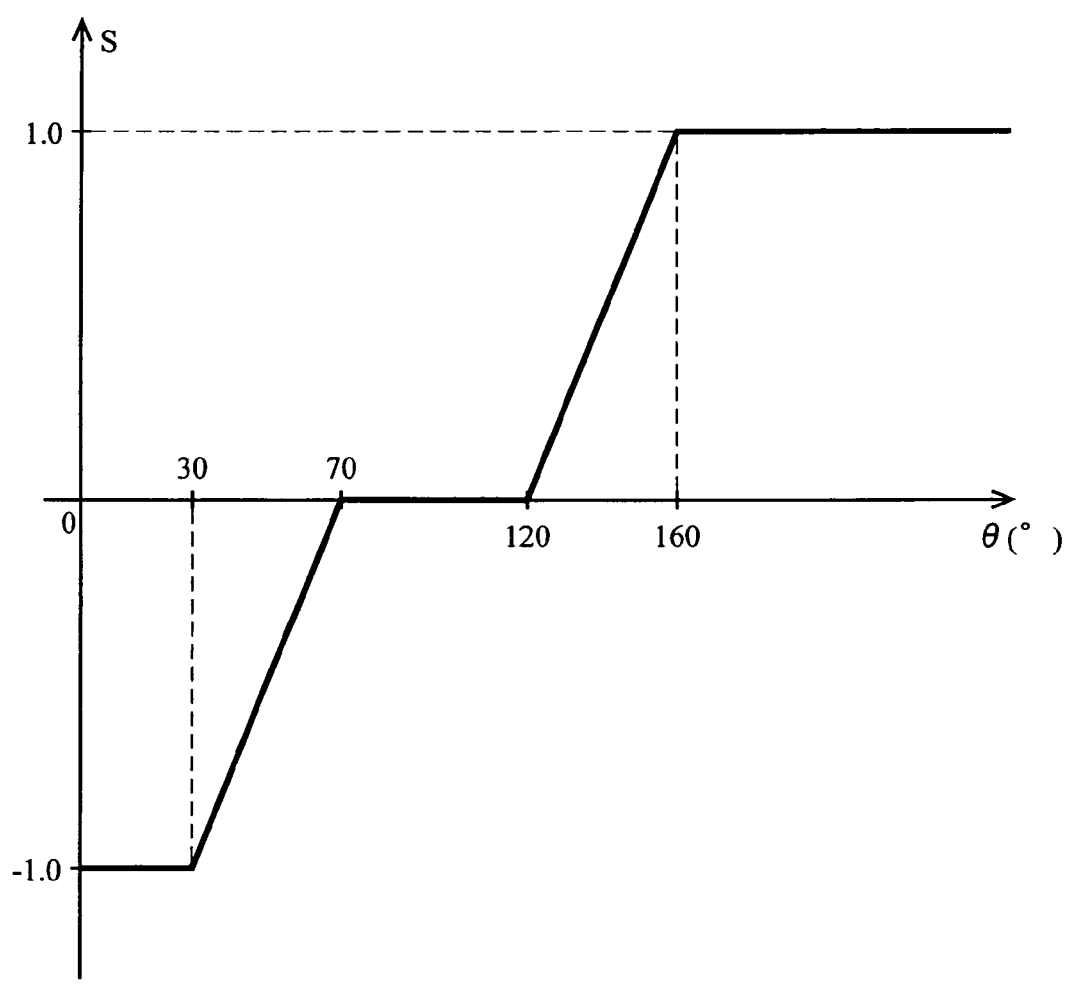
FIG. 15 is a graph illustrating an example of spin parameter S calculated in accordance with the angle $\theta$ shown in FIG. 14A through FIG. 14C.

With reference to FIG. 13 through FIG. 15, when the player is swinging the controller 7, a direction in which the player twists the controller 7 (twisting direction) is determined by a method described below using the X- and Y-axis direction acceleration data. FIG. 13 is an isometric view of the controller 7 illustrating the twisting directions thereof. FIG. 14A through FIG. 14C are graphs each illustrating an example of values of acceleration represented by each of the X- and Y-axis direction acceleration data in accordance with the twist given to the controller 7. FIG. 15 is a graph illustrating an example of spin parameter S calculated in accordance with the angle θ shown in FIG. 14A through FIG. 14C. In FIG. 14A through FIG. 14C, as in FIG. 9A through FIG. 9D, the points P are connected by arrows in the order in which the points P are obtained, and the origin ((X, Y)=(0, 0)) represents the value of the acceleration data in the state where no acceleration including the acceleration of gravity acts upon the acceleration sensor 701.

With reference to FIG. 13, when performing a leftward swing or a rightward swing of the controller 7, the player can provide the controller 7 with a "leftward twist" or a "rightward twist" around the Z-axis. The "leftward twist" refers to rotating the controller 7 counterclockwise with respect to the player around the Z axis, and the "rightward twist" refers to rotating the controller 7 clockwise with respect to the player around the Z axis. The result of a determination on the twist is reflected on a spin (a topspin or a backspin) given to the ball character BC.

In order to determine an angle at which the player twists the controller 7 (twisting angle) while swinging the controller 7, it is necessary to analyze the X- and Y-axis direction acceleration data from the start until the end of the swing. In this embodiment, the twisting angle of the controller 7 is determined using a point Ps representing the X- and Y-axis direction acceleration data obtained at the start of the swing (the first point plotted in the X-Y coordinate system; start point) and a point Pe representing the X- and Y-axis direction acceleration data obtained at the end of the swing (the last point plotted in the X-Y coordinate system; end point).

For example, FIG. 14A shows an example of the X- and Y-axis direction acceleration data obtained from the start until the end of the swing when the player performs a horizontal leftward swing with the top surface of the controller 7 being kept upward (i.e., with no twist). An angle θ defined by a straight line connecting the start point Ps and the origin of the X-Y coordinate system and a straight line connecting the end point Pe and the origin (hereinafter, referred to as an "angle θ from the start point Ps to the end point Pe") is calculated, and a spin parameter S in accordance with the angle θ is set. Since the direction of gravity acting upon the controller 7 is constant, an intermediate angle θ is obtained. The angle θ is obtained by calculating an absolute value of an angle defined by a vector extending from the origin of the X-Y coordinate system to the start point Ps and a vector extending from the origin to the end point Pe.

FIG. 14B shows an example of the X- and Y-axis direction acceleration data obtained from the start until the end of the swing when the player performs a horizontal leftward swing while giving a leftward twist to the controller 7 from the state where the top surface of the controller 7 is directed upward. Since the direction of gravity acting upon the controller 7 changes clockwise in accordance with the twist, the angle θ from the start Ps to the end point Pe obtained by the leftward twist is larger than the angle θ obtained with no twist.

FIG. 14C shows an example of the X- and Y-axis direction acceleration data obtained from the start until the end of the swing when the player performs a horizontal leftward swing while giving a rightward twist to the controller 7 from the state where the top surface of the controller 7 is directed upward. Since the direction of gravity acting upon the controller 7 changes counterclockwise in accordance with the twist, the angle θ from the start Ps to the end point Pe obtained by the rightward twist is smaller than the angle θ obtained with no twist.

As described above, the direction or angle of a twist provided to the controller 7 during the swing can be determined using the angle θ from the start point Ps to the end point Pe. For example, in the case where the player is performing a leftward swing of the controller 7, the controller 7 is determined to be given a "leftward twist" when the angle θ is larger than a threshold value and is determined to be given a "rightward twist" when the angle θ is smaller than the threshold value. In the case where the player is performing a rightward swing of the controller 7, the direction of the twist is determined oppositely. Namely, in the case where the player is performing a rightward swing of the controller 7, the controller 7 is determined to be given a "rightward twist" when the angle θ is larger than the threshold value and is determined to be given a "leftward twist" when the angle θ is smaller than the threshold value. Using the start point Ps and the end point Pe represented by the X- and Y-axis direction acceleration data as coordinate points on the X-Y coordinate system, a rotation motion of the controller 7 around the Z axis, perpendicular to the X and Y axes, as the rotation axis can be determined. As appreciated from the above, the swinging velocity of the controller 7, and the rotation motion given by the player twisting the controller 7 while swinging the controller 7, are determined after the swing (after the motion recognition processing is completed). A second time period of the present invention is from the time when the controller 7 is determined to have been swung until the time when the swinging velocity or the rotation motion of the controller 7 is determined (after the player finishes swinging the controller 7).

In accordance with the difference between the angle θ obtained by the leftward twist or the rightward twist and the angle θ obtained with no twist (see FIG. 14A), an amount by which the player twists the controller 7 (twisting amount) can be determined. In this embodiment, a predetermined conversion table is used to convert the angle θ used for determining the twisting direction or the twisting angle into a spin parameter S in accordance with the value of the angle θ. Thus, the subsequent game processing is executed. A spin parameter S is, for example, a floating-point number in the range of −1.0 to 1.0 which is determined in accordance with the value of the angle θ. The game processing is executed such that the maximum effect of a backspin is provided when S=−1.0, and the maximum effect of a topspin is provided when S=1.0.

For example, as shown in FIG. 15, when the angle θ is θ≦30°, the angle θ is converted into a spin parameter S=−1.0. When the angle θ is 30°<θ≦70°, the angle θ is converted into a spin parameter S linearly changing in the range of −1.0 to 0.0. When the angle θ is 70°<θ≦120°, the angle θ is converted into a spin parameter S=0.0. When the angle θ is 120°<θ≦160°, the angle θ is converted into a spin parameter S linearly changing in the range of 0.0 to 0.1. When the angle θ is 160°<θ, the angle θ is converted into a spin parameter S=1.0. By adjusting such a conversion table, the effect of reflecting a twist given to the controller 7 on the game processing can be adjusted.

Figure 16A:
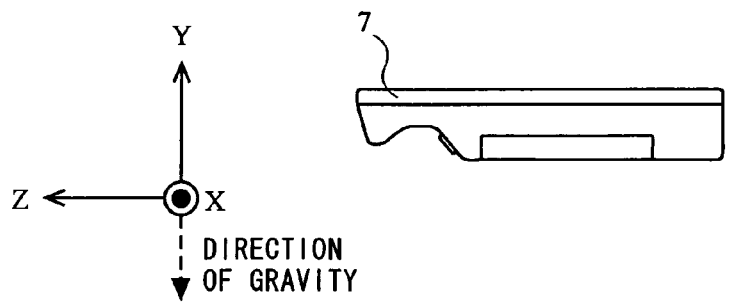
FIG. 16A through FIG. 16C illustrate the relationship between the state where the controller 7 is inclined upward or downward and the coordinate axes in such a state.
Figure 16B:
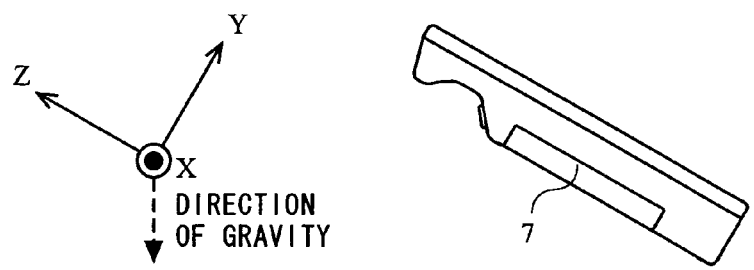
Figure 16C:
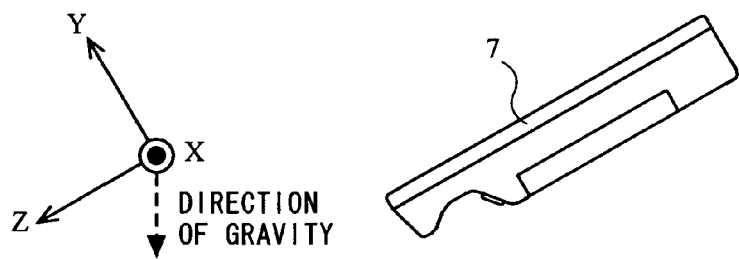
Figure 17:
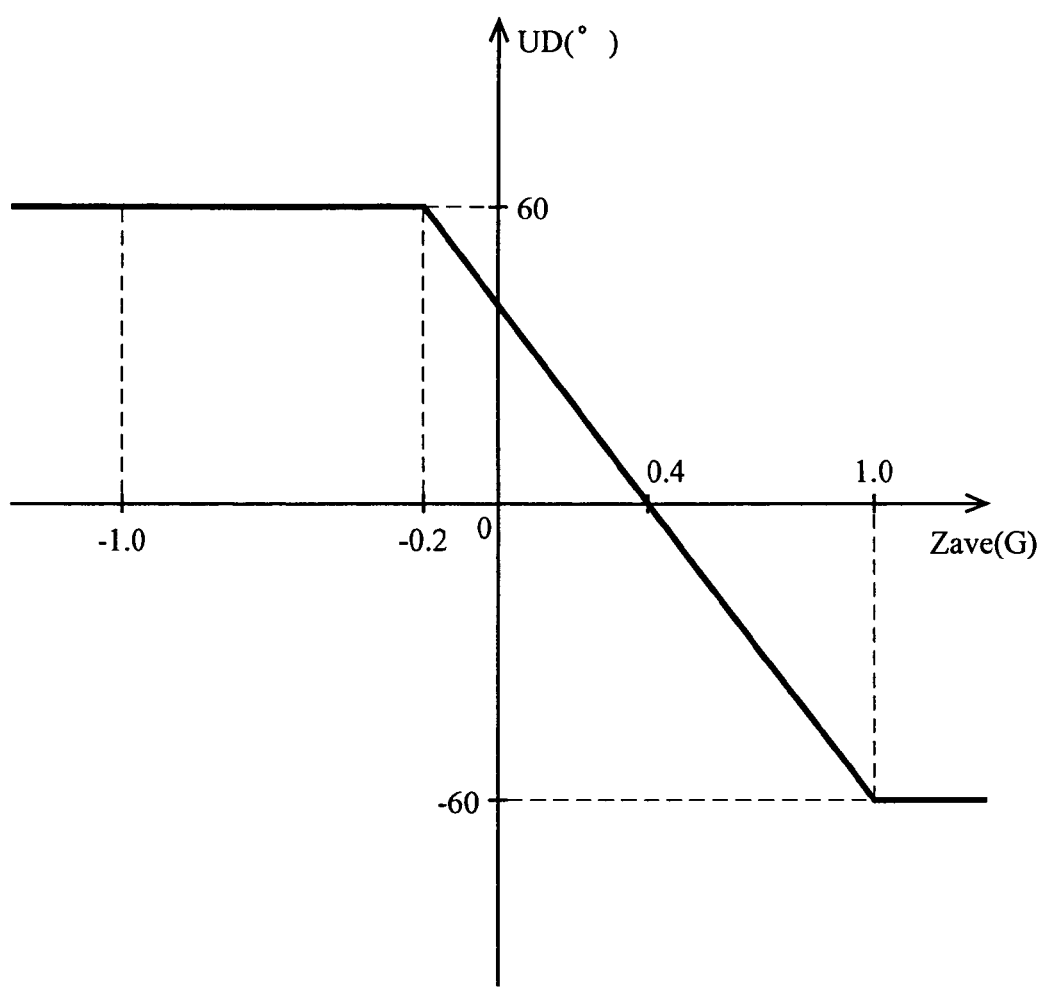
FIG. 17 is a graph illustrating an example of up-down angle UD calculated in accordance with Z-axis direction acceleration data.

With reference to FIG. 16A through FIG. 16C and FIG. 17, a method for determining a state where the controller 7 is being swung up or down will be described. FIG. 16A through FIG. 16C illustrate the relationship between the state where the controller 7 is inclined upward or downward and the coordinate axes in such a state. FIG. 17 is a graph illustrating an example of up-down angle UD calculated in accordance with Z-axis direction acceleration data.

In this embodiment, it is determined whether the controller 7 is being swung up or down based on the up-down direction of the controller 7 before the controller 7 is swung. For example, when the player inclines the front surface of the controller 7 downward at equal to or greater than a predetermined angle from the horizontal state before starting the swing, it is determined that the controller 7 is being swung up. When the player inclines the front surface of the controller 7 upward at equal to or greater than the predetermined angle from the horizontal state before starting the swing, it is determined that the controller 7 is being swung down.

Specifically, when it is determined that the controller 7 is being swung, the up-down direction of the controller 7 before the swing is determined based on the Z-axis direction acceleration data obtained during several frames immediately therebefore. For example, as shown in FIG. 16A, when the controller 7 is horizontal before the player starts swinging the controller 7, the acceleration of gravity acts in the negative Y-axis direction. Therefore, the Z-axis direction acceleration data does not reflect the influence of the acceleration of gravity. As shown in FIG. 16B, when the front surface of the controller 7 is inclined upward with respect to the horizontal state before the player starts swinging the controller 7, the acceleration of gravity acts in the negative Y-axis direction and a negative Z-axis direction. Therefore, the Z-axis direction acceleration data shows an acceleration in the negative Z-axis direction by the influence of the acceleration of gravity. As shown in FIG. 16C, when the front surface of the controller 7 is inclined downward with respect to the horizontal state before the player starts swinging the controller 7, the acceleration of gravity acts in the negative Y-axis direction and the positive Z-axis direction. Therefore, the Z-axis direction acceleration data shows an acceleration in the positive Z-axis direction by the influence of the acceleration of gravity. Accordingly, the up-down direction of the controller 7 before the player starts swinging the controller 7 can be determined by analyzing the Z-axis direction acceleration data obtained before the player starts swinging the controller 7.

In this embodiment, the obtained Z-axis direction acceleration data is stored in the main memory 33. When it is determined that the controller 7 is being swung, an average value Zave of the Z-axis direction acceleration data obtained in 30 immediately previous frames is converted into an up-down angle UD of the controller 7. Thus, the subsequent game processing is executed.

For example, as shown in FIG. 17, when the average value Zave is Zave≦−0.2 G, the average value Zave is converted into an up-down angle UD=60°. When the average value Zave is −0.2 G<Zave≦1.0 G, the average value Zave is converted into an up-down angle UD linearly changing in the range of 60° to −60°. When the average value Zave is 1.0 G<Zave, the average value Zave is converted into an up-down angle UD=−60°. The up-down angle UD into which the average value Zave is converted is eccentric toward the positive Z-axis direction. The reason is as follows. Since the Z-axis direction acceleration data is always eccentric to the positive Z-axis direction at the start of the swing. In consideration of the influence of this, the up-down angle UD is made eccentric to the positive Z-axis direction. By adjusting such a conversion table, the effect of reflecting the Z-axis direction acceleration data obtained before the player starts swinging the controller 7 on the game processing can be adjusted.

Figure 18:
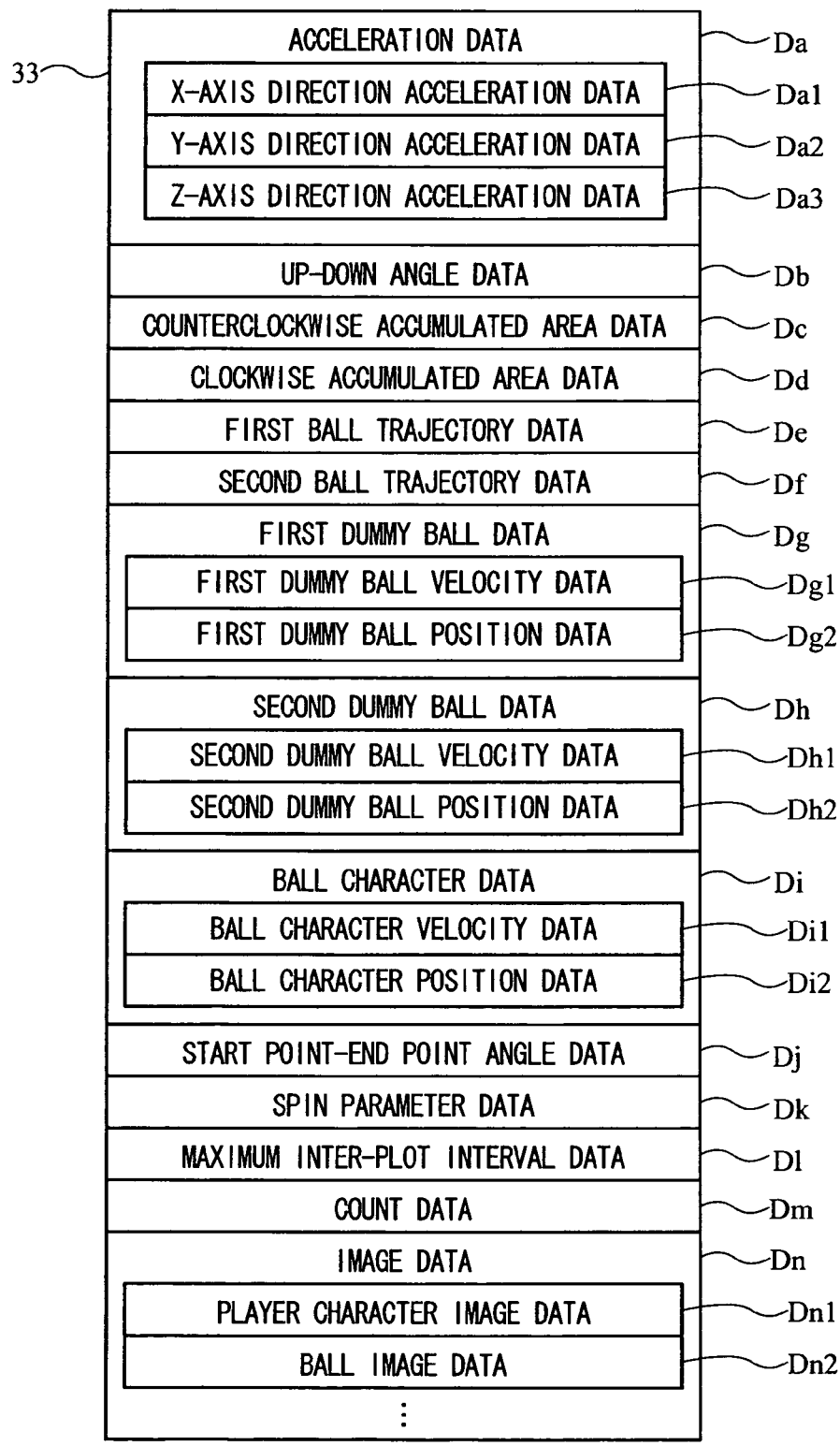
FIG. 18 shows main data stored in the main memory 33 of the game apparatus 3.

Next, the game processing performed by the game system 1 will be described in detail. With reference to FIG. 18, main data used for the game processing will be described. FIG. 18 shows main data stored in the main memory 33 of the game apparatus 3.

As shown in FIG. 18, the main memory 33 includes stored therein acceleration data Da, up-down angle data Db, counterclockwise accumulated area data Dc, clockwise accumulated area data Dd, first ball trajectory data De, second ball trajectory data Df, first dummy ball data Dg, second dummy ball data Dh, ball character data Di, start point-end point angle data Dj, spin parameter data Dk, maximum inter-plot interval data Dl, count data Dm, image data Dn and the like. In addition to data shown in FIG. 18, the main memory 33 also includes stored therein data on the player character PC, the opponent character EC and the like appearing in the game (position data, etc.), data on the virtual game space (topography data, etc.) and other data necessary for the game processing.

The acceleration data Da is included in a series of operation information which is transmitted from the controller 7 as transmission data. A predetermined number of frames (for example, 30 frames for one frame (1/60 sec.) as a game processing interval) of the obtained acceleration data Da is stored. The acceleration data Da includes X-axis direction acceleration data Da1, Y-axis direction acceleration data Da2, and Z-axis direction acceleration data Da3 detected by the acceleration sensor 701 as components of the X-, Y- and Z-axis directions. The receiving unit 6 included in the game apparatus 3 receives the acceleration data Da included in the operation information transmitted from the controller 7 at a predetermined time interval (for example, every 5 ms) and accumulates the acceleration data Da in a buffer (not shown) in the receiving unit 6. Then, the acceleration data Da is read a unit of one frame as the game processing interval, and stored in the main memory 33.

The up-down angle data Db represents an up-down angle UD (see FIG. 16A through FIG. 16C and FIG. 17) calculated based on the Z-axis direction acceleration data Da3 obtained from the controller 7 before the controller 7 is swung. The counterclockwise accumulated area data Dc represents the accumulated areas of the triangles (see FIG. 12) formed using the acceleration data showing a counterclockwise shift with respect to the origin of the X-Y coordinate system. The clockwise accumulated area data Dd represents the accumulated areas of the triangles (see FIG. 12) formed using the acceleration data showing a clockwise shift with respect to the origin of the X-Y coordinate system.

The first ball trajectory data De represents a trajectory of the ball character BC moving in the virtual game space based on data obtained on an initial stage of motion recognition processing described later (the initial stage functions as a "first time period"; and such a trajectory will be referred to as a "first ball trajectory TR1" and is an example of first behavior information of the present invention). The second ball trajectory data Df represents a trajectory of the ball character BC moving in the virtual game space based on data obtained in the entire period of motion recognition processing described later (the entire period of motion recognition processing functions as a "second time period"; and such a trajectory will be referred to as a "second ball trajectory TR2" and is an example of second behavior information of the present invention). The first dummy ball data Dg includes first dummy ball velocity data Dg1 and first dummy ball position data Dg2. The first dummy ball velocity data Dg1 is velocity vector data which represents the velocity of a first dummy ball moving along the trajectory represented by the first ball trajectory data De in the virtual game space. The first dummy ball position data Dg2 is coordinate position data which represents the position of the first dummy ball moving along the trajectory represented by the first ball trajectory data De in the virtual game space. The second dummy ball data Dh includes first dummy ball velocity data Dh1 and second dummy ball position data Dh2. The second dummy ball velocity data Dh1 is velocity vector data which represents the velocity of a second dummy ball moving along the trajectory represented by the second ball trajectory data Df in the virtual game space. The second dummy ball position data Dh2 is coordinate position data which represents the position of the second dummy ball moving along the trajectory represented by the second ball trajectory data Df in the virtual game space. The ball character data Di includes ball character velocity data Di1 and ball character position data Di2. The ball character velocity data Di1 is velocity vector data which represents a current velocity of the ball character BC in the virtual game space. The ball character position data Di2 is coordinate position data which represents a current position of the ball character BC in the virtual game space.

The start point-end point angle data Dj represents an angle θ from the start point Ps to the end point Pe in the X-Y coordinate system (see FIG. 14A through FIG. 14C). The spin parameter data Dk represents a spin parameter S (see FIG. 15) obtained by converting the angle θ. The maximum inter-plot interval data Dl represents a maximum data interval among the intervals between points plotted in a time series manner in the X-Y coordinate system based on the X- and Y-axis direction acceleration data obtained throughout the motion recognition processing. The count data Dm represents a counted value used for a flowchart described later.

The image data Dn includes player character image data Dn1, ball image data Dn2 and the like, and used for generating a game image by locating the player character PC and the ball character BC in the virtual game space.

Figure 19:
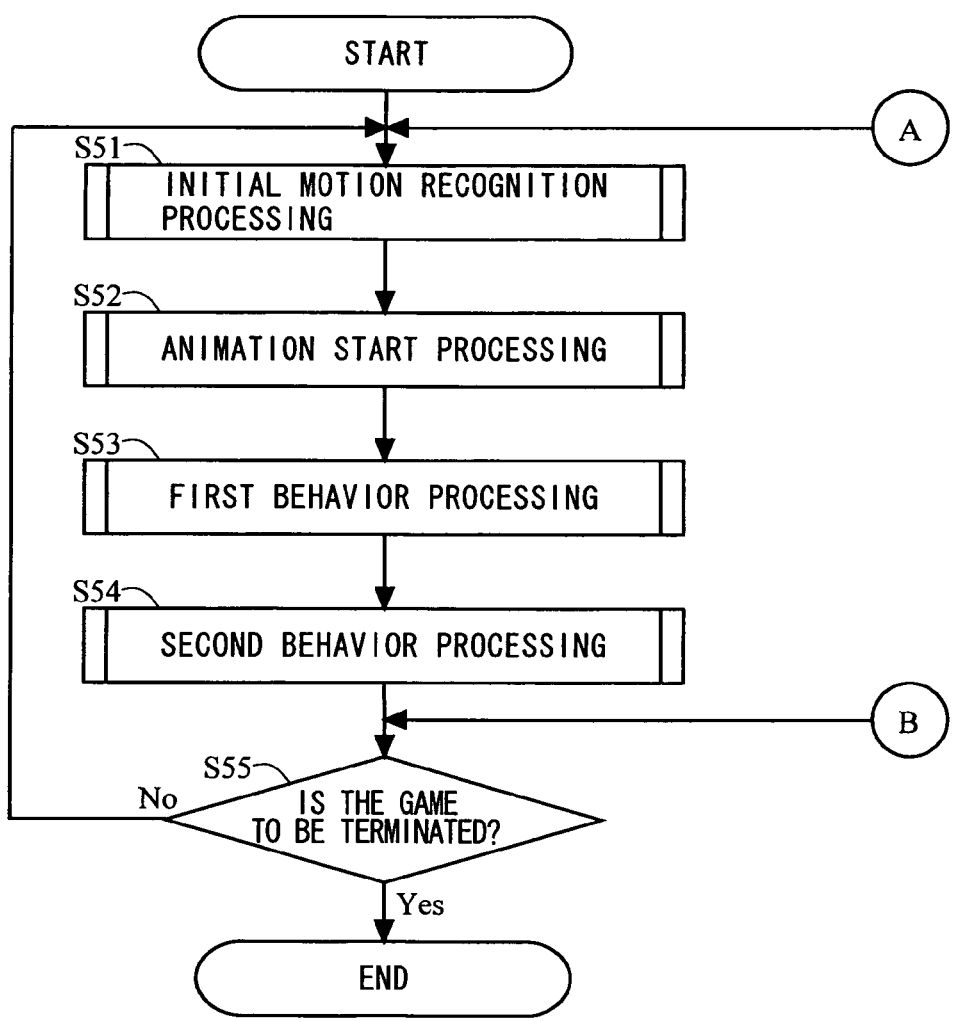
FIG. 19 is a flowchart illustrating a flow of the game processing executed by the game apparatus 3.
Figure 20:
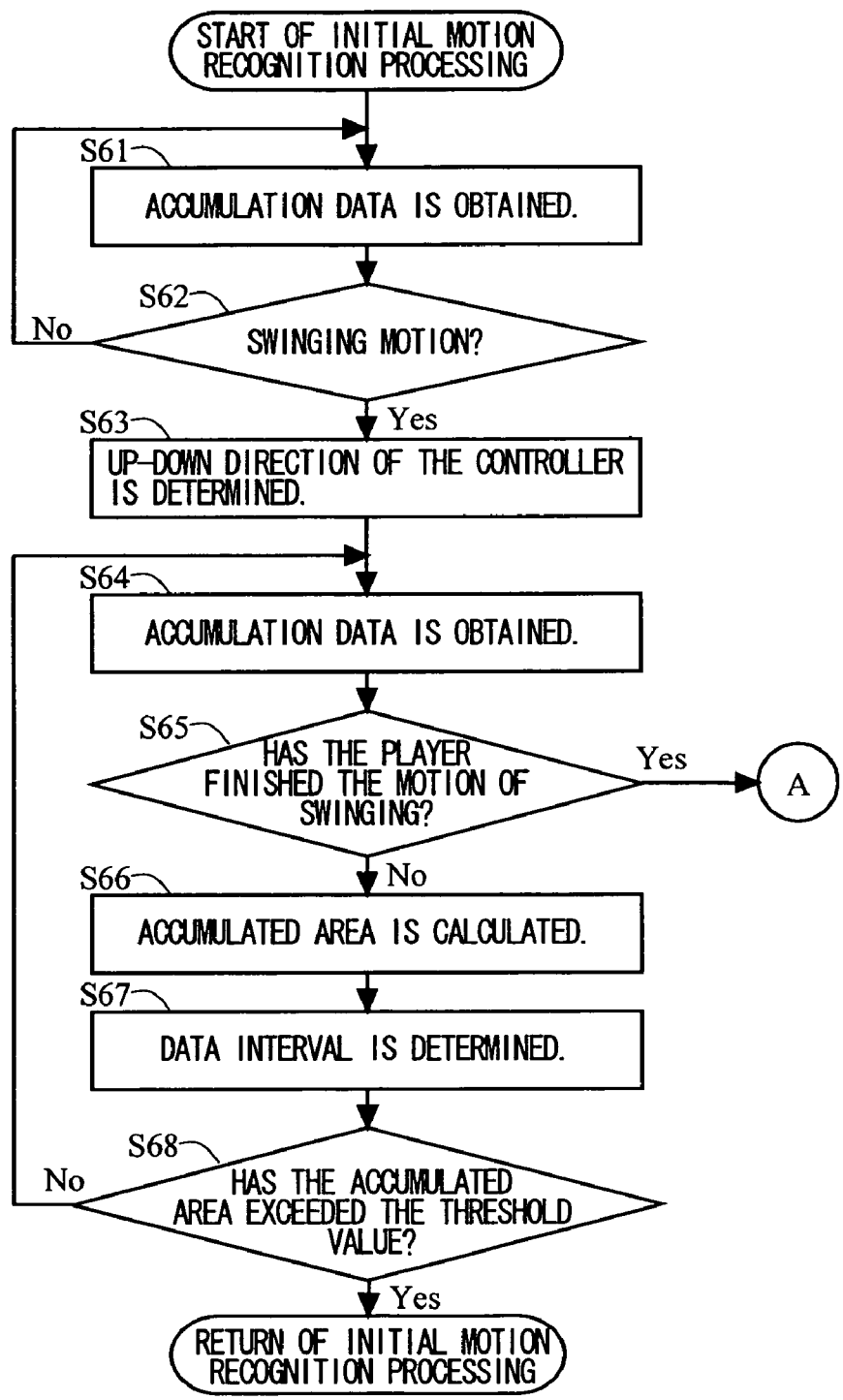
FIG. 20 is a flowchart illustrating a sub-routine of a detailed operation of initial motion recognition processing in step 51 shown in FIG. 19.
Figure 21:
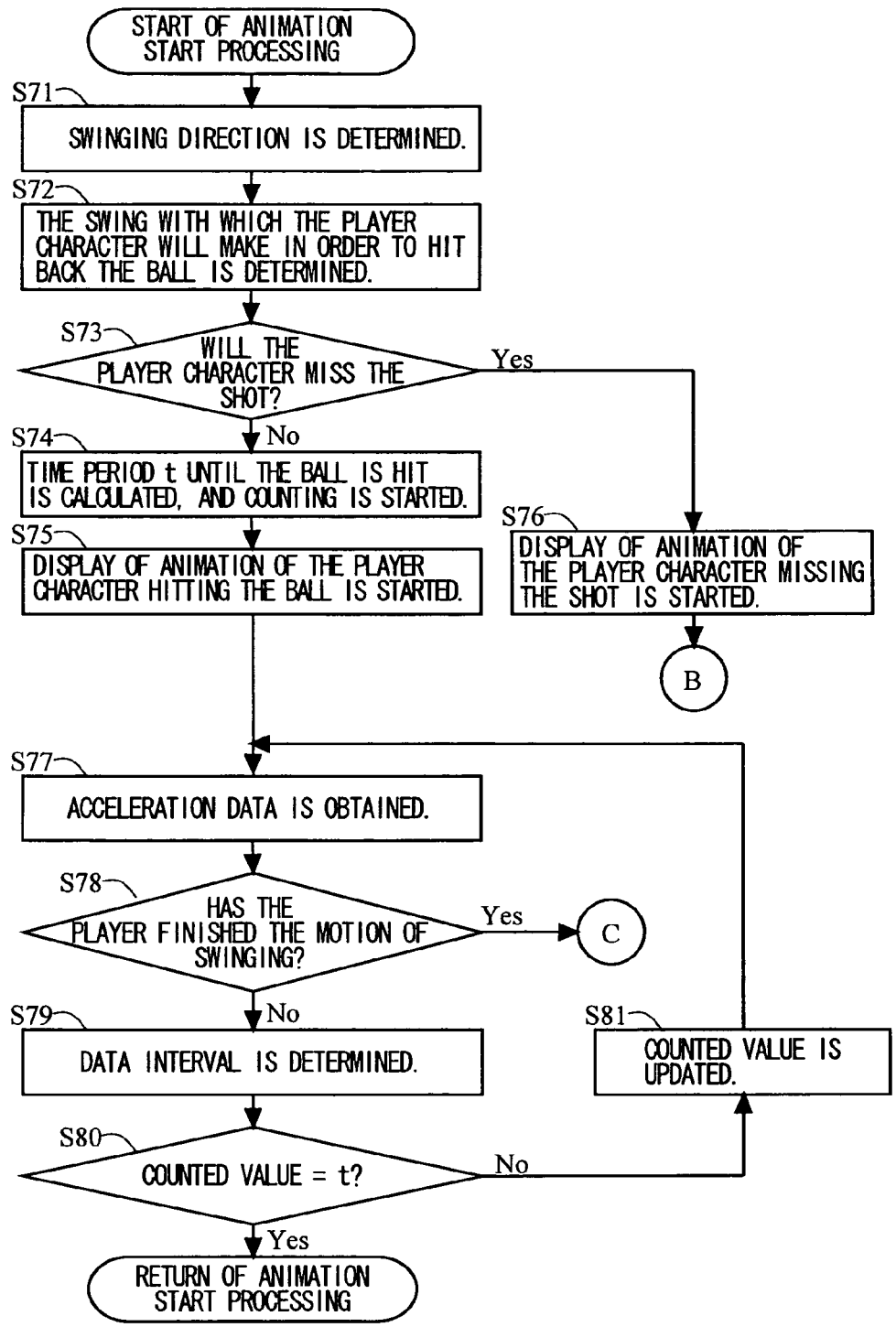
FIG. 21 is a flowchart illustrating a sub-routine of a detailed operation of animation start processing in step 52 shown in FIG. 19.
Figure 22:
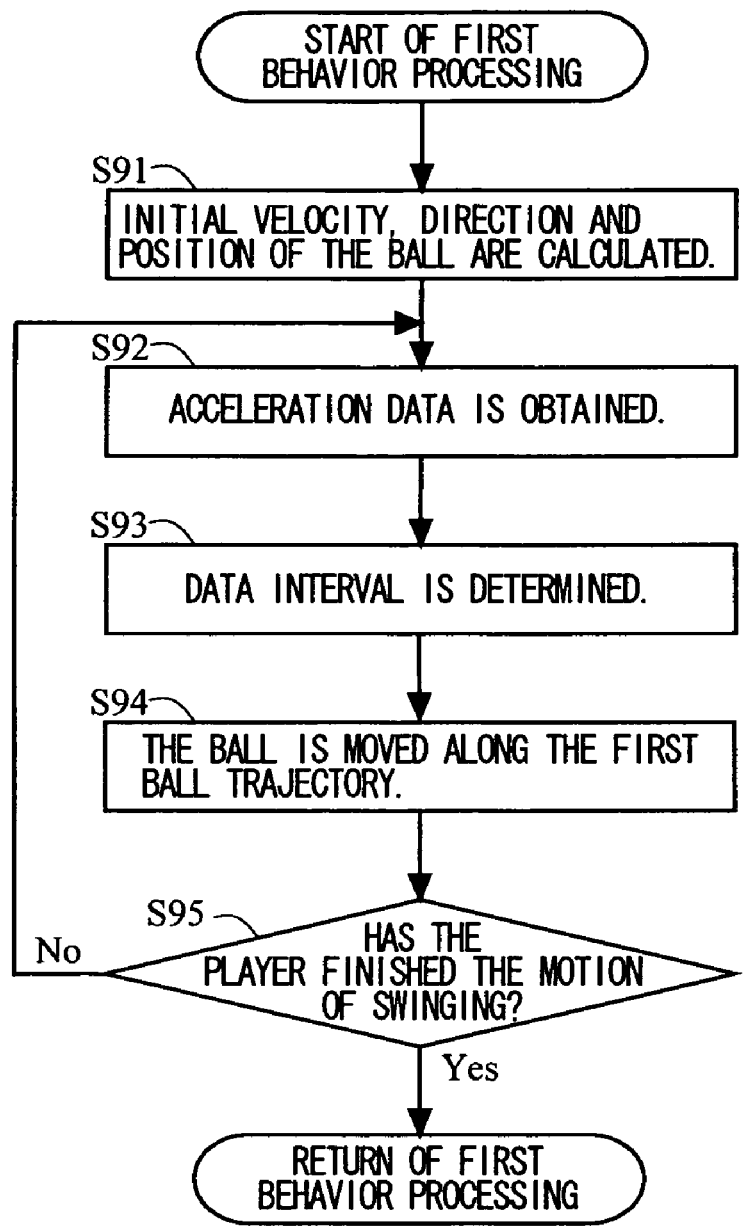
FIG. 22 is a flowchart illustrating a sub-routine of a detailed operation of first behavior processing in step 53 shown in FIG. 19.
Figure 23:
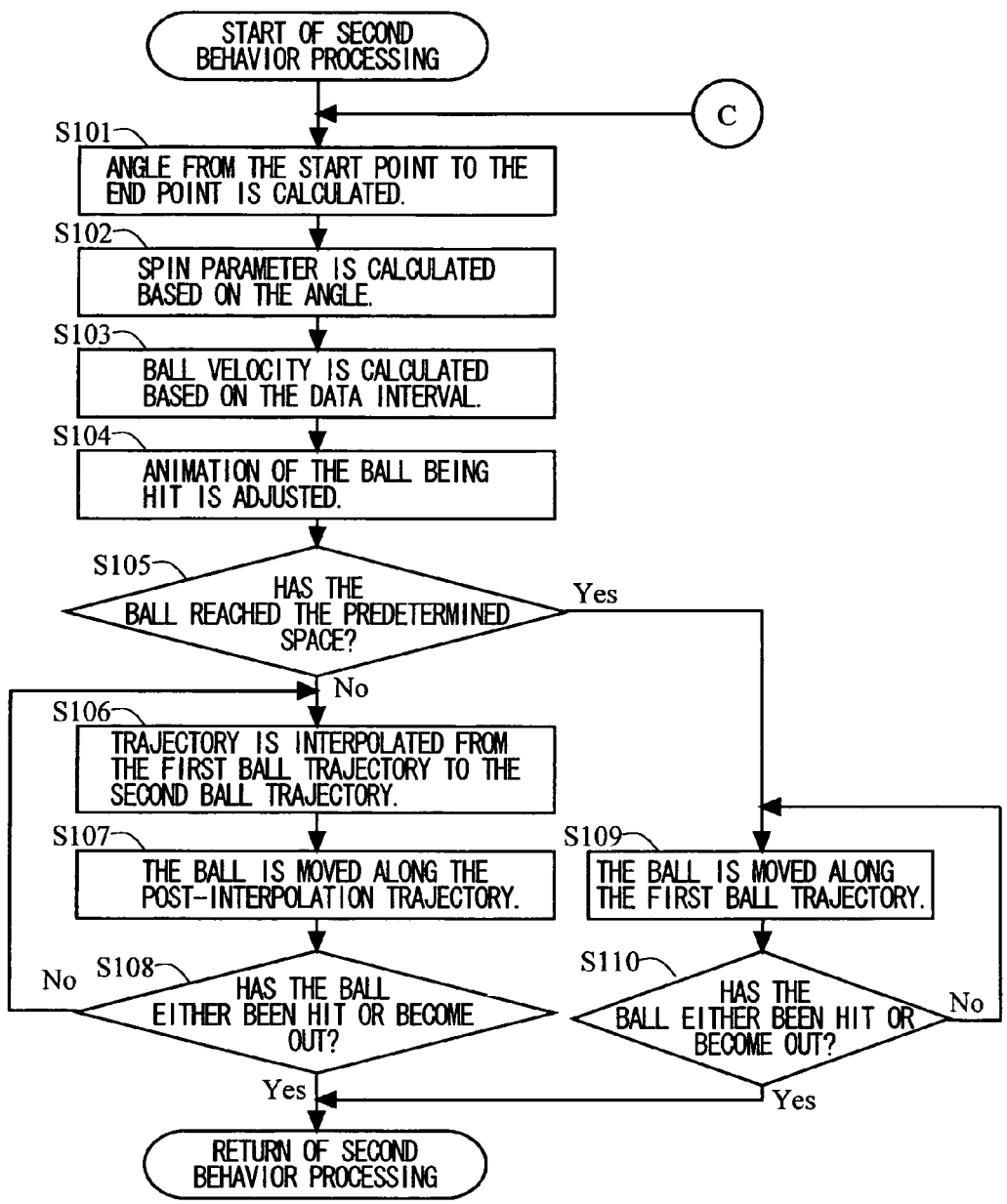
FIG. 23 is a flowchart illustrating a sub-routine of a detailed operation of second behavior processing in step 54 shown in FIG. 19.
Figure 24:
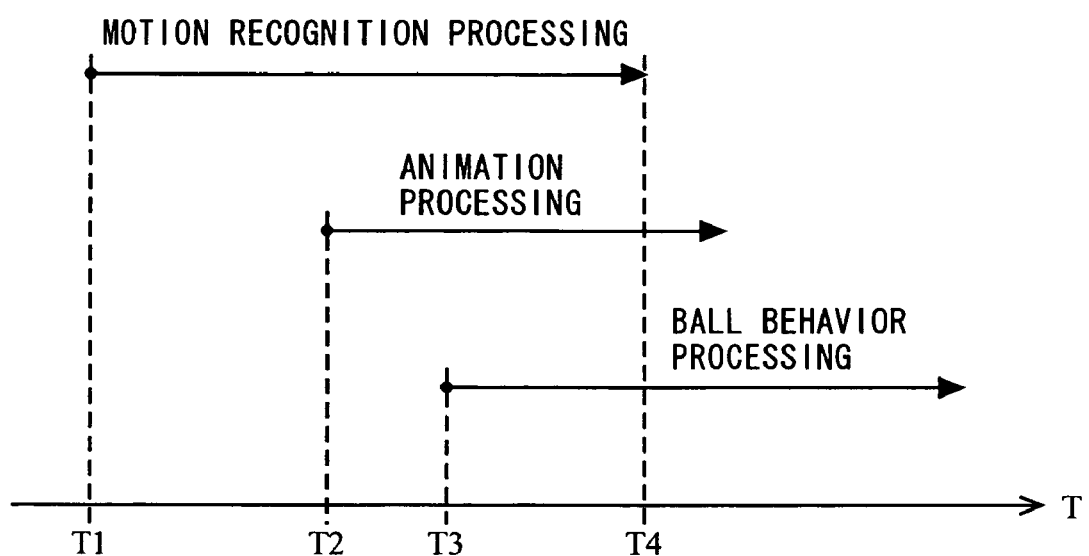
FIG. 24 shows timing of motion recognition processing, animation processing, and ball behavior processing.
Figure 27:
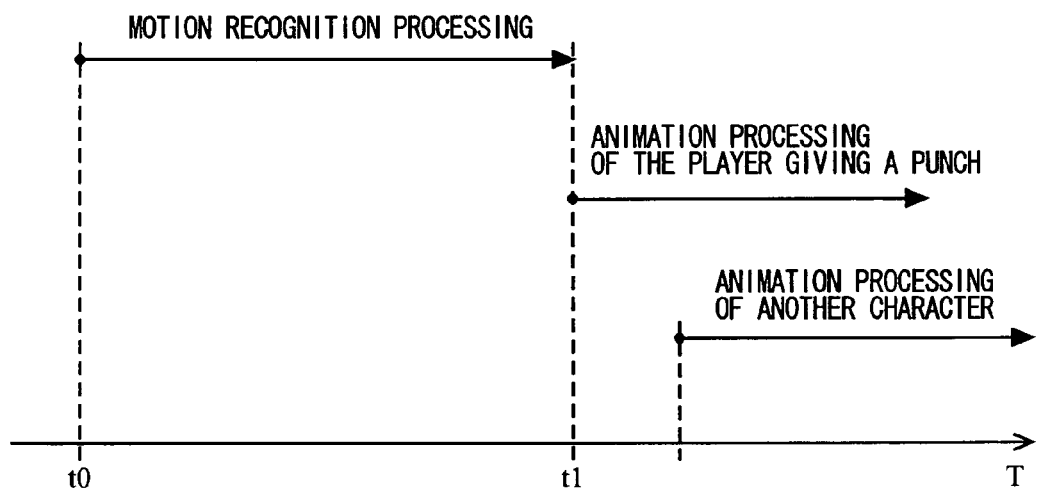
FIG. 27 shows timing of motion recognition processing and animation processing performed by a conventional game apparatus.

With reference to FIG. 19 through FIG. 26, the game processing performed by the game apparatus 3 will be described in detail. FIG. 19 is a flowchart illustrating a flow of the game processing executed by the game apparatus 3. FIG. 20 shows a sub-routine of a detailed operation of initial motion recognition processing in step 51 shown in FIG. 19. FIG. 21 shows a sub-routine of a detailed operation of animation start processing in step 52 shown in FIG. 19. FIG. 22 shows a sub-routine of a detailed operation of first behavior processing in step 53 shown in FIG. 19. FIG. 23 shows a sub-routine of a detailed operation of second behavior processing in step 54 shown in FIG. 19. FIG. 24 shows timing of motion recognition processing, animation processing, and ball behavior processing. FIG. 25 shows exemplary behaviors determined in accordance with the spin parameter S. FIG. 26 shows an example of the first ball trajectory TR1 and the second ball trajectory TR2. With reference to the flowcharts in FIG. 19 through FIG. 23, game processing performed based on a game operation by the player swinging the controller 7 will be described, and other parts of the game processing not directly relevant to the present invention will be omitted. In FIG. 19 through FIG. 23, each of steps performed by the CPU 30 will be represented with "S".

When the power of the game apparatus 3 is turned on, the CPU 30 of the game apparatus 3 executes a start program stored in a boot ROM (not shown) to initialize the elements including the main memory 33. The game program stored on the optical disc 4 is read to the main memory 33, and thus the CPU 30 starts executing the game program. The flowcharts shown in FIG. 19 through FIG. 23 illustrate the game processing executed after the above-described processing is completed.

As shown in FIG. 19, the CPU 30 sequentially executes the initial motion recognition processing (step 51), the animation start processing (step 52), the first behavior processing (step 53), and the second behavior processing (step 54). The details of these processing will be described later. After step 54, the CPU 30 determines whether or not to terminate the game (step 55). The game can be terminated, for example, when a condition for terminating the game is fulfilled (e.g., the tennis game played by the player character PC is over) or when the player performs an operation for terminating the game. When it is determined that the game is not to be terminated, the CPU 30 returns to step 51 and repeats the processing. When it is determined that the game is to be terminated, the CPU 30 terminates the processing illustrated in the flowchart in FIG. 19.

With reference to FIG. 20, the initial motion recognition processing in step 51 will be described. The CPU 30 obtains acceleration data included in the operation information received from the controller 7 (step 61), and advances the processing to the next step. The CPU 30 stores the obtained acceleration data in the main memory 33 as acceleration data Da. The acceleration data Da obtained in step 61 includes X-, Y-, and Z-axis direction acceleration data Da1, Da2 and Da3 detected by the acceleration sensor 701 as components of three axial directions (X-, Y- and Z-axis directions). The communication section 75 transmits the operation information to the game apparatus 3 at a predetermined time interval (for example, every 5 ms), and thus at least the acceleration data is accumulated in the buffer (not shown) in the receiving unit 6. The CPU 30 obtains the acceleration data by a unit of one frame, which is a game processing unit, and stores the acceleration data in the main memory 33.

Next, the CPU 30 determines whether or not the controller 7 is being swung by the player using the obtained acceleration data (step 62). Specifically, when the Z-axis direction acceleration data Da3 obtained in step 61 represents a positive Z-axis direction value exceeding a threshold value, the CPU 30 determines that the player is swinging the controller 7. In this case, the CPU 30 advances the processing to the next step. When the player is not swinging the controller 7, the CPU 30 returns to step 61 and repeats the above-described processing.

In step 63, the CPU 30 determines the up-down direction of the controller 7 before the swing, and advances the processing to the next step. Specifically, the CPU 30 calculates an average value Zave of the Z-axis direction acceleration data Da3 in several immediately previous frames (for example, 30 frames) stored in the main memory 33. Then, the CPU 30 converts the average Zave into the up-down angle UD (see FIG. 17) and stores data representing the up-down angle UD as the up-down angle data Db.

Next, the CPU 30 obtains the acceleration data included in the operation information received from the controller 7 by substantially the same processing as step 61 (step 64), and determines whether or not the player has finished the motion of swinging the controller 7 based on whether or not the obtained Z-axis direction acceleration data Da3 represents a value equal to or less than the threshold value (step 65). When the player is still swinging the controller 7, the CPU 30 advances the processing to step 66. When the player has finished the motion of swinging the controller 7, the CPU 30 returns to step 51 and repeats the above-described processing.

In step 66, the CPU 30 accumulates the areas of the triangles defined by the accelerated data Da obtained in step 64 and the origin of the X-Y coordinate system, and advances the processing to the next step. Specifically, as described above with reference to FIG. 12, when the acceleration data Da obtained in step 64 shows a counterclockwise shift with respect to the origin, the CPU 30 accumulates the area of the resultant triangle on the counterclockwise accumulated area data Dc as necessary and stores the obtained data. When the acceleration data Da obtained in step 64 shows a clockwise shift with respect to the origin, the CPU 30 accumulates the area of the resultant triangle on the clockwise accumulated area data Dd as necessary and stores the obtained data.

Next, the CPU determines an interval between points plotted in the X-Y coordinate system (data interval) based on the acceleration data Da obtained in step 64 (step 67), and advances the processing to the next step. Specifically, when the obtained data interval is larger than the data interval included in the current maximum inter-plot interval data Dl, the CPU 30 updates the maximum inter-plot interval data Dl to the obtained data interval. When the obtained data interval is equal to or smaller than the data interval included in the current maximum inter-plot interval data Dl, the CPU 30 advances the processing to the next step without updating.

Next, the CPU 30 determines whether or not either one of the accumulated area represented by the counterclockwise accumulated area data Dc and the accumulated area represented by the clockwise accumulated area data Dd has exceeded a threshold value (step 68). When either one of the areas has exceeded the threshold value, the CPU 30 terminates the processing of this sub-routine and advances the processing to step 52 in FIG. 19. When neither area has exceeded the threshold value, the CPU 30 returns to step 64 and repeats the above-described processing.

With reference to FIG. 21, the animation start processing in step 52 will be described. After step 68, the CPU 30 determines the swinging direction of the controller 7 (step 71), and advances the processing to the next step. For example, when it is determined in step 68 that the accumulated area represented by the counterclockwise accumulated area data Dc has exceeded the threshold value, this means that the acceleration data shows a counterclockwise shift with respect to the origin of the X-Y coordinate system. Thus, it is determined that the player is performing a "rightward swing" (see FIG. 7). When it is determined in step 68 that the accumulated area represented by the clockwise accumulated area data Dd has exceeded the threshold value, this means that the acceleration data shows a clockwise shift with respect to the origin of the X-Y coordinate system. Thus, it is determined that the player is performing a "leftward swing" (see FIG. 7).

As is clear from steps 68 and 71, the processing in step 71 is executed when either one of the counterclockwise accumulated area data Dc and the clockwise accumulated area data Dd has exceeded the threshold value. The processing in step 71 is not executed when the player finishes the motion of swinging the controller 7. As shown in FIG. 24, processing of recognizing the motion from the start until the end of the swing of the controller 7 by the player (motion recognition processing) is executed from time T1 to time T4. Processing of displaying an animation of the player character PC swinging the tennis racket (animation processing) starts at time T2, i.e., in the middle of the motion recognition processing. Namely, the swinging direction of the controller 7 is determined at a point after the player starts swinging the controller 7 but before the player finishes swinging the controller 7 (when the first time period is terminated), and is reflected on the game image. The initial motion recognition processing in step 51 is executed from time T1 to time T2 as a part of the motion recognition processing.

The relationship between (i) the swinging direction of the controller 7 and (ii) which of the counterclockwise accumulated area and the clockwise accumulated area has exceeded the threshold value varies in accordance with the setting of the coordinate axes for the controller 7, the characteristics of the acceleration sensor, the setting of the X-Y coordinate system and the like. Such a relationship may be adjusted in accordance with such settings as necessary. Specifically, the swinging direction of the controller 7 can be accurately determined by analyzing the relationship between (i) the swinging direction of the controller 7 and (ii) which of the counterclockwise accumulated area and the clockwise accumulated area has exceeded the threshold value, with respect to the direction of acceleration of gravity based on the obtained acceleration data.

Next, the CPU 30 determines the swing with which the player character PC will make in order to hit back the ball character BC (step 72), and determines whether or not the player character PC will miss the shot (step 73). In the steps executed so far, the player character PC has not started the motion of swinging the racket. However, the CPU 30 can estimate and determine whether or not the player character PC will be able to hit back the ball character BC flying toward the player character PC with a current swing, based on data on a current position and an estimated future position of the player character PC, a current position and an estimated future trajectory of the ball character BC, the swinging direction of the tennis racket by the player character PC and the like. When it is estimated that the player character PC will miss the shot, the CPU 30 starts processing of displaying an animation of the player character PC missing the shot on the monitor (step 76), and advances the processing to step 55 in FIG. 19. When it is estimated that the player character PC will be able to hit back the ball character BC, the CPU 30 advances the processing to step 74.

In step 74, the CPU 30 counts a time period t from the current time until the player character PC hits back the ball character BC, and starts counting to update the count data Dn. The CPU 30 starts processing of displaying an animation of the player character PC hitting back the ball character BC on the monitor (step 75), and advances the processing to the next step. The animation of the player character PC hitting back the ball character BC is provided with a swing in accordance with the up-down angle UD. Namely, an animation of the player character PC swinging up or swinging down the racket in the up-down direction represented by the up-down angle UD is displayed. The animation displayed based on the information obtained before the player finishes swinging the controller 7 represents a predetermined series of motions of the player character PC and is an example of first behavior information of the present invention.

Next, the CPU 30 obtains the acceleration data included in the operation information received from the controller 7 (step 77), and determines whether or not the player has finished the motion of swinging the controller 7 based on the acceleration data (step 78). When the player is still swinging the controller 7, the CPU 30 advances the processing to step 79. When the player has finished the motion of swinging the controller 7, the CPU 30 advances the processing to step 101 (see FIG. 23).

The processing of obtaining the acceleration data in step 77 is substantially the same as that in step 61 and will not be described in detail. The method for determining whether or not the player has finished the motion of swinging the controller 7 in step 78 is substantially the same as that in step 62 except that the acceleration data obtained in step 77 is used, and will not be described in detail.

In step 79, the CPU 30 determines an interval between points plotted in the X-Y coordinate system (data interval) based on the acceleration data obtained in step 77. The processing of determining the data interval in step 79 is substantially the same as that in step 67 except that the acceleration data obtained in step 77 is used, and will not be described in detail. Next, the CPU 30 determines whether or not the current counted value of the count data Dn has reached the time t (step 80). When the current counted value of the count data Dn has not reached the time t, the CPU 30 updates the current counted value in the count data Dn (step 81). Then, the CPU 30 returns to step 77 and repeats the above-described processing. When the current counted value of the count data Dn has reached the time t, the CPU 30 terminates the processing in this sub-routine and advances the processing to step 53 in FIG. 19.

With reference to FIG. 22, the first behavior processing in step 53 will be described. After step 80, the CPU 30 calculates the initial velocity, direction and position at which the ball character BC is hit back, displays the ball character BC at the calculated position (step 91), and advances the processing to the next step. Specifically, the CPU 30 represents the velocity and direction of the ball character BC by a velocity vector (vx, vy, vz) and stores data representing the velocity vector in the ball character velocity data Di1. The magnitude of the velocity vector (vx, vy, vz) is set to a fixed value. The direction of the velocity vector (vx, vy, vz) is set based on the swinging direction of the controller 7 by the player, the relationship between the timing when the player starts swinging the controller 7 and the timing when the ball character BC arrives at the player, the up-down angle UD and the like. Specifically, the left-right direction in which the ball character BC is hit back is determined by the left-right direction in which the player character PC swings the tennis racket (i.e., the swinging direction of the controller 7) and the timing at which the player character PC hits the ball character BC (i.e., the time at which the player starts swinging the controller 7). The up-down direction in which the ball character BC is hit back is determined by the up-down direction in which the player character PC swings the tennis racket (i.e., the up-down angle UD). For example, when the up-down angle UD has a positive value, the player swings down the controller 7. Therefore, the velocity vector of the ball character BC is set to a low value in correspondence to the value of the up-down angle UD. When the up-down angle UD has a negative value, the player swings up the controller 7. Therefore, the velocity vector of the ball character BC is set to a high value in correspondence to the value of the up-down angle UD. The CPU 30 indicates the position at which the ball character BC is hit by the tennis racket of the player character PC with a coordinate position (x, y, z) in the virtual game space, and stores the data representing the coordinate position in the ball character position data Di2.

Next, the CPU 30 obtains the acceleration data included in the operation information received from the controller 7 (step 92). The CPU 30 determines an interval between points plotted in the X-Y coordinate system (data interval) based on the acceleration data Da obtained in step 92 (step 93), and advances the processing to the next step. The processing of obtaining the acceleration data in step 92 is substantially the same as that in step 61 and will not be described in detail. The processing of determining the data interval in step 93 is substantially the same as that in step 67 except that the acceleration data obtained in step 92 is used, and will not be described in detail.

The CPU 30 calculates the first ball trajectory TR1 based on the velocity vector (vx, vy, vz) and the coordinate position (x, y, z) stored in the current ball character velocity data Di1 and ball character position data Di2. Then, the CPU 30 displays the ball character BC while moving the ball character BC along the first ball trajectory TR1 (step 94). More specifically, the CPU 30 defines the physical laws of the real world (for example, gravity, air resistance, influence of wind) in the virtual game space virtually or strictly. The CPU 30 calculates the first ball trajectory TR1 based on the velocity vector (vx, vy, vz), the coordinate position (x, y, z), the spin parameter S (here, S=0.0), and the physical laws, and stores the first ball trajectory TR1 in the first ball trajectory data De. Then, the CPU 30 newly calculates the velocity vector (vx, vy, vz) and the coordinate position (x, y, z) of the ball character BC such that the ball character BC moves along the first ball trajectory TR1. The CPU 30 stores the newly calculated velocity vector (vx, vy, vz) and coordinate position (x, y, z) in the ball character velocity data Di1 and the ball character position data Di2, and displays the ball character BC at the coordinate position (x, y, z) on the monitor 2. Then, the CPU 30 advances the processing to the next step. As appreciated from the above, the first ball trajectory TR1 is calculated based on operation information obtained from the controller 7 before the player finishes swinging the controller 7 (the first time period), and is used as information for controlling the position (state) of the ball character BC along the passage of time after this (the first behavior information).

Next, the CPU 30 determines whether or not the player has finished the motion of swinging the controller 7 based on the acceleration data obtained in step 92 (step 95). When the player is still swinging the controller 7, the CPU 30 returns to step 92 and repeats the above-described processing. When the player has finished the motion of swinging the controller 7, the CPU 30 advances the processing to step 54 in FIG. 19. The method for determining whether or not the player has finished the motion of swinging the controller 7 in step 95 is substantially the same as that in step 62 except that the acceleration data obtained in step 92 is used, and will not be described in detail.

As is clear from steps 91 through 95, the first behavior processing is executed from the time when the ball character BC is hit until the time when the player finishes swinging the controller 7. As shown in FIG. 24, processing of representing a behavior of the ball character BC being hit back (ball behavior processing) starts at time T3, i.e., in the middle of the motion recognition processing. Namely, the manner in which the ball character BC is hit back is reflected on the game image based on the operation information (acceleration data) obtained at a point after the player starts swinging the controller 7 but before the player finishes swinging the controller 7. The animation start processing in step 52 is executed from time T2 to time T3 as a part of the animation processing. The first behavior processing in step 53 is executed from time T3 to time T4 as a part of the ball behavior processing. The second behavior processing described below represents a behavior of the ball character BC being hit after the player finishes swinging the controller 7, and starts at time T4 as a part of the behavior processing.

With reference to FIG. 23, the second behavior processing in step 54 will be described. After step 95, the CPU 30 calculates the angle θ from the start point Ps to the end point Pe (see FIG. 14A through FIG. 14C) and stores the angle θ in the start point-end point angle data Dj (step 101). Next, the CPU 30 converts the angle θ into a spin parameter S (see FIG. 15), and stores the spin parameter S in the spin parameter data Dk (step 102). Based on the data interval stored in the maximum inter-plot interval data Dl, the CPU 30 calculates the velocity vector (v2x, v2y, v2z) of the second dummy ball, stores the velocity vector in the second dummy ball velocity data Dh1 (step 103), and advances the processing to the next step.

As the velocity vector (v2x, v2y, v2z) of the second dummy ball, the velocity vector of the ball character BC back at the time when the player character PC hit the ball character BC with the tennis racket (time T3 shown in FIG. 24) is re-calculated in consideration of the influence of the data interval (i.e., the swinging velocity of the controller 7). Accordingly, the magnitude of the velocity vector (v2x, v2y, v2z) is set in accordance with the data interval. Specifically, when the data interval is relatively large, the velocity vector is set to be relatively large, whereas when the data interval is relatively small, the velocity vector is set to be relatively small. The direction of the velocity vector (v2x, v2y, v2z) is set in substantially the same manner as step 91.

Next, the CPU 30 performs the processing of adjusting the animation of the player character PC hitting back the ball character BC, which is started in step 75, displays the animation on the monitor 2 (step 104), and advances the processing to the next step. In step 75 (time T2 shown in FIG. 24), only the left-right and up-down directions and the timing of the player swinging the controller 7 are known. Therefore, the animation is started based on only such information. In step 104 (time T4 shown in FIG. 24), the twisting angle given to the controller 7 by the player and the swinging velocity of the controller 7 are also known. Therefore, an animation also based on such additional information can be represented. In step 104, a topspin or a backspin found from the twisting angle and the swinging velocity found from the data interval are reflected on the animation started in step 75 and displayed on the monitor 2. The animation adjusted based on the information obtained after the player starts swinging the controller 7 until the player finishes swinging the controller 7 represents a predetermined series of motions of the player character PC and is an example of second behavior information of the present invention.

Next, the CPU 30 refers to the ball character position data Di2 to determine whether or not the ball character BC has reached a predetermined space in the virtual game space (step 105). The "predetermined space" refers to, for example, a space above the opponent's court or a space outside the tennis court set in the virtual game space. When the ball character BC has not reached the predetermined space, the CPU 30 advances the processing to step 106. When the ball character BC has reached the predetermined space, the CPU 30 advances the processing to step 109.

In step 106, the CPU 30 calculates the first ball trajectory TR1 and the second ball trajectory TR2, and performs processing of interpolating the trajectory of the ball character BC from the first ball trajectory TR1 to the second ball trajectory TR2. The CPU 30 moves the ball character BC along the post-interpolation trajectory to update the ball character velocity data Di1 and the ball character position data Di2, and displays the ball character BC on the monitor 2 (step 107). Then, the CPU 30 advances the processing to step 108.

With reference to FIG. 25 and FIG. 26, the second ball trajectory TR2 and the interpolation processing will be described. The first ball trajectory TR1 of the ball character BC calculated in step 94 is obtained only based on the information recognized in the initial motion recognition processing (the left-right and up-down directions and the timing at which the controller 7 is swung). The second ball trajectory TR2 of the ball character BC is calculated further based on information obtained throughout the motion recognition processing (the twisting angle and the swinging velocity of the controller 7).

The second ball trajectory TR2 is calculated as follows, like the first ball trajectory TR1. The CPU 30 defines the physical laws of the real world in the virtual game space. The CPU 30 calculates the second ball trajectory TR2 based on the velocity vector (v2x, v2y, v2z), the coordinate position (x2, y2, z2), the spin parameter S, and the physical laws, and stores the second ball trajectory TR2 in the second ball trajectory data Df. More specifically, the CPU 30 calculates the second ball trajectory TR2 by adding the influence of the spin parameter S to a trajectory calculated in substantially the same manner as the first ball trajectory TR1 using the coordinate position (x2, y2, z2) at which the ball character BC is hit by the tennis racket of the player character PC and the velocity vector (v2x, v2y, v2z) obtained in step 103. As appreciated from the above, the second ball trajectory TR2 is calculated based on operation information obtained from the controller 7 after the player starts swinging the controller 7 until the player finishes swinging the controller 7 (the second time period), and is used as information for controlling the position (state) of the ball character BC along the passage of time after this (the second behavior information).

As shown in FIG. 25, when the player performs a "leftward swing" of the controller 7 with a "leftward twist" or performs a "right ward swing" of the controller 7 with a "rightward twist", the spin parameter S is S>0.0, which represents a topspin. When the player performs a "leftward swing" of the controller 7 with a "rightward twist" or performs a "right ward swing" of the controller 7 with a "leftward twist", the spin parameter S is S<0.0, which represents a backspin. When the spin parameter S represents a topspin (S>0.0), the CPU 30 changes the trajectory so as to rapidly go down in the up-down direction. When the spin parameter S represents a backspin (S<0.0), the CPU 30 changes the trajectory such that the flying distance of the ball character BC increases in the up-down direction and the ball character BC curves in the left-right direction in accordance with the swinging direction (such that the ball character BC curves rightward in the case of a "leftward swing" and curves leftward in the case of a "rightward swing"). When the spin parameter S represents no twist (S=0.0), the CPU 30 does not change the trajectory as an influence of the spin.

As shown in FIG. 24 and FIG. 26, the second ball trajectory TR2 is calculated at time T4 when the player finishes swinging the controller 7. At this point, the ball character BC displayed on the monitor 2 is already moving along the first ball trajectory TR1 (thick line in FIG. 26 between time T3 and time T4). The trajectory reflecting all the data obtained by the player swinging the controller 7 is the second ball trajectory TR2. Therefore, it is desirable to modify the trajectory of the ball character BC from the first ball trajectory TR1 to the second ball trajectory TR2 such that the ball character BC moves along the second ball trajectory TR2. In order to move the ball character BC along the second ball trajectory TR2 without making the player feel unnatural, it is necessary to make a shift from the first ball trajectory TR1 to the second ball trajectory TR2 smoothly (thick line in FIG. 26 between time T4 and time T5). In this embodiment, in the process of shifting the first ball trajectory TR1 to the second ball trajectory TR2 (thick line in FIG. 26 between time T4 and time T5), a dummy ball which is not displayed is flown along each of the first ball trajectory TR1 and the second ball trajectory TR2. A position at which the positions of the dummy balls are interpolated is set as the position of the ball character BC.

The CPU 30 sets a dummy ball flown along the first ball trajectory TR1 as a first dummy ball B1. A first dummy ball velocity (v1x, v1y, v1z) and a first dummy ball position (x1, y1, z1) are provided as the parameters of the first dummy ball B1. The CPU 30 sets a dummy ball flown along the second ball trajectory TR2 as a second dummy ball B2. A second dummy ball velocity (v2x, v2y, v2z) and a second dummy ball position (x2, y2, z2) are provided as the parameters of the second dummy ball B2. An interpolation time period Ti is set as a time period required for the interpolation (time T5 to time T6 shown in FIG. 26).

At time T4, the CPU 30 stores the ball character velocity (vx, vy, vz) and the ball character position (x, y, z), stored in the ball character data Di, in the first dummy ball data Dg as the first dummy ball velocity (v1x, v1y, v1z) and the first dummy ball position (x1, y1, z1). Based on the second dummy ball data Dh, the CPU 30 moves the second dummy ball B2 along the second dummy ball trajectory TR2 to a position corresponding to the time T4 and updates the second dummy ball data Dh.

At time Tn between time T4 and time T5, the CPU 30 updates the parameters of the first dummy ball B1 and the second dummy ball B2 by physical calculations, and moves the first dummy ball B1 and the second dummy ball B2 frame by frame along the first dummy ball trajectory TR1 and the second dummy ball trajectory TR2 respectively. The CPU 30 uses the following equations to calculate the position and velocity at which the dummy balls are to be interpolated and thus update the ball character velocity data Di1 and the ball character position data Di2 (thick line between time T4 and time T5 shown in FIG. 26).

$$ratio=(Tn-T4)\div Ti$$

$$x=x2\times ratio+x1\times(1.0-ratio)$$

$$y=y2\times ratio+y1\times(1.0-ratio)$$

$$z=z2\times ratio+z1\times(1.0-ratio)$$

$$vx=v2x\times ratio+v1x\times(1.0-ratio)$$

$$vy=v2y\times ratio+v1y\times(1.0-ratio)$$

$$vz=v2z\times ratio+v1z\times(1.0-ratio)$$

As shown here, the ball character velocity data Di1 and the ball character position data Di2 between time T4 and time T5 are obtained by weighting the velocity and position of the first dummy ball B1 and the second dummy ball B2, obtained at a predetermined time interval, at a predetermined ratio and averaging the resultant velocity and position.

After time T5 (thick line after time T5 shown in FIG. 26), the CPU 30 abandons the first dummy ball B1 and the second dummy ball B2. The CPU 30 calculates the second ball trajectory TR2 based on the velocity vector (vx, vy, vz) and the coordinate position (x, y, z) stored in the current ball character velocity data Di1 and ball character position data Di2. The CPU 30 moves the ball character BC along the second ball trajectory TR2 to update the ball character velocity data Di1 and the ball character position data Di2, and displays the ball character BC on the monitor 2.

Returning to FIG. 23, in step 108, the CPU 30 determines whether or not the ball character BC either has been hit back toward the opponent character EC or has become out (directly gone out of the court). When the ball character BC has not been hit back toward the opponent character EC or has not become out, the CPU 30 returns to step 106 and repeats the above-described processing. When the ball character BC either has been hit back toward the opponent character EC or has become out, the CPU 30 terminates the processing of this sub-routine and advances the processing to step 55 in FIG. 19.

When, in step 105, the ball character BC has reached the predetermined space, the CPU 30 displays the ball character BC while moving the ball character BC along the first ball trajectory TR1 (step 109), and advances the processing to the next step. More specifically, the CPU 30 calculates the first ball trajectory TR1 based on the velocity vector (vx, vy, vz) and the coordinate position (x, y, z) stored in the current ball character velocity data Di1 and ball character position data Di2. The CPU 30 displays the ball character BC while moving the ball character BC along the first ball trajectory TR1. The processing in step 109 is substantially the same as step 94, and will not be described in detail.

Next, the CPU 30 determines whether or not the ball character BC either has been hit back toward the opponent character EC or has become out (directly gone out of the court) (step 110). When the ball character BC has not been hit back toward the opponent character EC or has not become out, the CPU 30 returns to step 109 and repeats the above-described processing. When the ball character BC either has been hit back toward the opponent character EC or has become out, the CPU 30 terminates the processing of this sub-routine and advances the processing to step 55 in FIG. 19.

As described above, in a game in which the player provides an operation input using the controller 7, the processing of reflecting the operation input on the state of the game object starts in the middle of the period for determining the operation input. Therefore, there is no delay with respect to the operation input, and the problem of the maneuverability being spoiled is solved. In addition, after the above-mentioned determining period is over, the processing of reflecting the operation input, obtained after the above-described processing, on the state of the game object is executed. Therefore, a real-time game performance is provided while accurately reflecting the operation input which is provided by the player.

In this embodiment, as a period for obtaining operation information used for setting an animation of the first ball trajectory TR1, the second ball trajectory TR2 and the player character PC, the first time period and the second time period are set. As described above, the first time period is from the time when the player starts swinging the controller 7 until the time when the swinging direction is determined in the middle of the motion recognition processing. The second time period is from the time when the player starts swinging the controller 7 until the time when the player finishes swinging the controller 7 (the entire period of the motion recognition processing). Alternatively, time periods may be set based on other criteria.

For example, three or more time periods may be set for the period of the motion recognition processing, and operation information obtained during each period may be reflected on the state of the game object. In this case, the ball trajectory or the like is set in accordance with the set time periods, and therefore more behavior information is usable for changing the state of the game object. For example, a time period may be set for each frame (for each game processing unit) to continuously provide behavior information. In this case, the state of the game object is continuously changed.

Alternatively, one time period may be divided. For example, the above-described determination on the twisting motion of the controller 7 is performed using the start point Ps and the end point Pe. Therefore, the time period for determining only the twisting motion may be only at the time when the player starts swinging the controller 7 and at the time when the player finishes swinging the controller 7. In this case, the time period for determining only the twisting motion may include two periods, i.e., a period including the time when the player starts swinging the controller 7 and a period including the time when the player finishes swinging the controller 7.

A plurality of time periods set for the motion recognition processing may partially overlap each other, may be continuous to each other with no overlap, or may be discrete with a predetermined period therebetween. The time period(s) of the present invention is (are) set for the period in which the motion recognition processing is executed. The time period(s) may be set in any manner as long as the operation information obtained during the time period(s) is reflected on the state of the game object in real time. The second time period of the present invention is set as a period which is terminated after the first time period at the earliest and provides newer operation information time-wise than the operation information obtained during the first time period.

In the above-described game processing, the first ball trajectory TR1 and the second ball trajectory TR2 are calculated frame by frame (i.e., calculated with the processing loop of each of steps 94, 106 and 109). The trajectories may be calculated in other manners. For example, the first ball trajectory TR1 and the second ball trajectory TR2 once calculated may be stored in a memory and the stored data may be used as necessary. In this case, the first ball trajectory TR1 and/or the second ball trajectory TR2 may be calculated before the processing loop (for example, after step 91, after step 103). In this case, it is not necessary to calculate the trajectories frame by frame.

In the above description, the acceleration data in three axial directions output from the controller 7 is used to play a tennis game. The acceleration data may be used for other types of game processing. For example, the present invention is applicable to a game in which the player character swings some type of object (ping pong, badminton, baseball, cutting something with a sword, etc.). In the above description, a game apparatus for determining a motion of the controller 7 is included in the game system 1. The present invention is applicable to an information processing apparatus such as a general personal computer operated by an input device including an acceleration sensor. Based on a determination result of an information processing apparatus, various processing can be executed. For example, in accordance with the determined motion of the input device, data displayed by the information processing apparatus may be moved, the page of information displayed by the information processing apparatus may be changed, or graphics are drawn. The game apparatus may create motion data representing a motion of the input device in accordance with the determined motion of the input device and output the motion data to another apparatus.

The acceleration sensor 701 of the controller 7 is preferably a triaxial acceleration sensor for determining and outputting accelerations as components of three axial directions perpendicular to one another. However, an acceleration sensor for detecting an acceleration in at least two axial directions perpendicular to each other may be used. For example, the above-described left-right swinging direction or twisting direction can be determined using an acceleration sensor for determining and outputting the acceleration in a three-dimensional space in which the controller 7 is located, as components of two axial directions, i.e., X-axis and Y-axis directions (see FIG. 3 and FIG. 4). In this case, the start and the end of the swing cannot be determined using the Z-axis direction acceleration, unlike the above embodiment. However, the start and the end of the swing may be determined using a centrifugal component which is generated by a left-right swing obtained by the X-axis and Y-axis direction accelerations, or using a sensor different from the acceleration sensor 701. Alternatively, a game rule that one of the operations buttons 72 should be pressed when the player swings the controller 7 may be provided, so that the start and the end of the swing can be determined in accordance with the time period in which such a button is being pressed.

In the above-described exemplary game, a state of a game object is changed using a shift of acceleration data in accordance with a motion of the controller 7, and an act of the player of moving the controller 7 is used as an example of the input given from the controller 7. The present invention can be realized in other embodiments. For example, the present invention is applicable to a game in which a state of a game object is changed using a shift of processing result data which is output from the imaging information calculation section 74 (see FIG. 6), using an act of the player of moving the controller 7 as an example of the input. The processing result data which is output from the imaging information calculation section 74 changes in accordance with the motion of the controller 7 like the acceleration data, and therefore is usable for the present invention in substantially the same manner. Alternatively, the present invention is applicable to a game in which a state of a game object is changed using a shift of an output from another type of sensor (e.g., a position sensor) built in or provided outside the controller 7 for determining a motion of the controller 7.

In the above description, the controller 7 and the game apparatus 3 are connected to each other by wireless communication. Alternatively, the controller 7 and the game apparatus 3 may be electrically connected to each other via a cable. In this case, the cable connected to the controller 7 is connected to a connection terminal of the game apparatus 3.

In the above description, the receiving unit 6 connected to the connection terminal of the game apparatus 3 is used as receiving means for receiving transmission data which is wirelessly transmitted from the controller 7. Alternatively, the receiving means may be a receiving module built in the game apparatus 3. In this case, the transmission data received by the receiving module is output to the CPU 30 via a predetermined bus.

The shape of the controller 7, and the shape, number, position or the like of the operation section 72 provided in the controller 7 are merely exemplary, and may be altered without departing from the scope of the present invention. The position of the imaging information calculation section 74 in the controller 7 (the light incident opening of the imaging information calculation section 74) does not need to be on the front surface of the housing 71, and may be on another surface as long as light can enter from the outside of the housing 71.

A game apparatus and a storage medium having a game program stored thereon according to the present embodiment are usable in a game of changing a state of a game object in accordance with an input given from an input device and capable of changing the object in real time in accordance with such an input, and are applicable to, for example, a game of operating a game object in accordance with a motion of a game controller, or information processing of moving display information or the like in accordance with a motion of an input device.

While the example embodiment has been described in detail, the foregoing description is in all aspects illustrative and not restrictive. It is understood that numerous other modifications and variations can be devised without departing from the scope of the example embodiment presented herein.

What is claimed is:

1. A game apparatus for executing game processing of changing a state of an object in accordance with an input given to an input device;

the game apparatus comprising:

storage locations;

data obtaining programmed logic circuitry for sequentially obtaining operation information which is output in accordance with a motion of the input device and storing the operation information in the storage locations;

first behavior setting programmed logic circuitry for setting first behavior information representing a state of the object after a first time period, which is a part of a recognition period for determining a motion of the input device, in accordance with operation information obtained during the first time period using operation information;

first object processing programmed logic circuitry for sequentially changing the state of the object after the first time period based on the first behavior information;

second behavior setting programmed logic circuitry for setting second behavior information representing a state of the object after a second time period, which is terminated after the first time period and is at least a part of the recognition period, in accordance with operation information obtained during the second time period;

second object processing programmed logic circuitry for sequentially changing the state of the object after the second time period based on at least the second behavior information; and display control programmed logic circuitry for sequentially displaying an image of the object on a display in accordance with the state of the object, wherein the first behavior represents a trajectory of the object due to the motion of the input device from the beginning of the motion of the input device until a point before the end of the motion of the input device, and the second behavior represents a trajectory of the object due to the motion of the input device from the beginning of the motion of the input device until the end of the motion of the input device, and wherein the display control programmed logic circuitry sequentially displays the image of the object based on gradual change of the trajectory of the object from said first behavior to said second behavior over a predetermined time period.

2. A game apparatus according to claim 1, wherein the second object processing programmed logic circuitry averages the state of the object based on the first behavior information and the state of the object based on the second behavior information, which are of an identical time point after the second time period, at a predetermined ratio, and gradually increases, along the passage of time, the ratio at which the state of the object based on the second behavior information contributes to the averaging so as to sequentially change the state of the object.

3. A game apparatus according to claim 2, wherein:

the first behavior information and the second behavior information each represent a position of the object in a virtual game world;

and the first object processing programmed logic circuitry and the second object processing programmed logic circuitry move the object to the position in the virtual game world represented by at least one of the first behavior information and the second behavior information.

4. A game apparatus according to claim 1, wherein:

the first behavior information and the second behavior information each represent a predetermined series of motions;

the first object processing programmed logic circuitry causes the object to perform the series of motions represented by the first behavior information so as to change the state of the object; and the second object processing programmed logic circuitry causes the object to perform the series of motions represented by the second behavior information so as to change the state of the object.

5. A game apparatus according to claim 3, further comprising determining programmed logic circuitry for determining that the input device has moved using the operation information to determine a moving velocity of the input device; wherein:

the first time period, the second time period and the recognition period start when the determination programmed logic circuitry determines that the input device has moved;

the first behavior setting programmed logic circuitry sets the first behavior information representing a position in the virtual game world to which the object is to move in accordance with a predetermined initial velocity; and the second behavior setting programmed logic circuitry sets the second behavior information representing a position in the virtual game world to which the object is to move in accordance with an initial velocity which is set based on the moving velocity of the input device determined during the second time period.

6. A game apparatus for executing game processing of changing a state of an object in accordance with an input given to an input device;

the game apparatus comprising:

storage means locations;

data obtaining programmed logic circuitry for sequentially obtaining operation information which is output in accordance with a motion of the input device and storing the operation information in the storage means locations;

first behavior setting programmed logic circuitry for setting first behavior information representing a state of the object after a first time period, which is a part of a recognition period for determining a motion of the input device, in accordance with operation information obtained during the first time period using operation information;

first object processing programmed logic circuitry for sequentially changing the state of the object after the first time period based on the first behavior information;

second behavior setting programmed logic circuitry for setting second behavior information representing a state of the object after a second time period, which is terminated after the first time period and is at least a part of the recognition period, in accordance with operation information obtained during the second time period;

second object processing programmed logic circuitry for sequentially changing the state of the object after the second time period based on at least the second behavior information; and display control programmed logic circuitry for sequentially displaying an image of the object on a display means in accordance with the state of the object, wherein:

the second object processing programmed logic circuitry averages the state of the object based on the first behavior information and the state of the object based on the second behavior information, which are of an identical time point after the second time period, at a predetermined ratio, and gradually increases, along the passage of time, the ratio at which the state of the object based on the second behavior information contributes to the averaging so as to sequentially change the state of the object;

the first behavior information and the second behavior information each represent a position of the object in a virtual game world;

the first object processing programmed logic circuitry and the second object processing programmed logic circuitry move the object to the position in the virtual game world represented by at least one of the first behavior information and the second behavior information, the game apparatus further comprises:

determining programmed logic circuitry for determining that the input device has moved using the operation information to determine a moving velocity of the input device;

the first time period, the second time period and the recognition period start when the determination programmed logic circuitry determines that the input device has moved;

the first behavior setting programmed logic circuitry sets the first behavior information representing a position in the virtual game world to which the object is to move in accordance with a predetermined initial velocity;

the second behavior setting programmed logic circuitry sets the second behavior information representing a position in the virtual game world to which the object is to move in accordance with an initial velocity which is set based on the moving velocity of the input device determined during the second time period;

the game processing is for executing a game in which a player character hits a ball so as to cause the ball to fly in the virtual game world;

the object is a ball object representing the ball moving in the virtual game world;

the initial velocity set by each of the first behavior setting programmed logic circuitry and the second behavior setting programmed logic circuitry is a velocity of the ball object given when the player character hits the ball object in the virtual game world; and the first behavior information and the second behavior information represent a trajectory in the virtual game world along which the ball object moves after being hit.

7. A game apparatus according to claim 5, wherein:
the determining programmed logic circuitry further determining a rotation motion of the input device around a predetermined direction as a rotation axis using the operation information; and
the second behavior setting programmed logic circuitry sets a rotation to be given to the object in accordance with the rotation motion of the input device determined during the second time period, and sets the second behavior information representing a position in the virtual game world to which the object given the rotation is to move.

8. A game apparatus according to claim 5, wherein:
the determining programmed logic circuitry further determines a posture of the input device before the input device moves using the operation information; and
the first behavior setting programmed logic circuitry sets a direction in which the object is to move in accordance with the posture of the input device determined by the determining programmed logic circuitry, and sets the first behavior information representing a position in the virtual game world to which the object is to move in the direction.

9. A game apparatus according to claim 1, wherein:
the first behavior information and the second behavior information each represent a position of the object in a virtual game world; and
the first object processing programmed logic circuitry and the second object processing programmed logic circuitry move the object to the position in the virtual game world represented by at least one of the first behavior information and the second behavior information.

10. A game apparatus according to claim 9, further comprising determining programmed logic circuitry for determining that the input device has moved using the operation information to determine a moving velocity of the input device; wherein:
the first time period, the second time period and the recognition period start when the determination programmed logic circuitry determines that the input device has moved;
the first behavior setting programmed logic circuitry sets the first behavior information representing a position in the virtual game world to which the object is to move in accordance with a predetermined initial velocity; and
the second behavior setting programmed logic circuitry sets the second behavior information representing a position in the virtual game world to which the object is to move in accordance with an initial velocity which is set based on the moving velocity of the input device determined during the second time period.

11. A game apparatus for executing game processing of changing a state of an object in accordance with an input given to an input device;
the game apparatus comprising:
storage means locations;
data obtaining programmed logic circuitry for sequentially obtaining operation information which is output in accordance with a motion of the input device and storing the operation information in the storage means locations;
first behavior setting programmed logic circuitry for setting first behavior information representing a state of the object after a first time period, which is a part of a recognition period for determining a motion of the input device, in accordance with operation information obtained during the first time period using operation information;
first object processing programmed logic circuitry for sequentially changing the state of the object after the first time period based on the first behavior information;
second behavior setting programmed logic circuitry for setting second behavior information representing a state of the object after a second time period, which is terminated after the first time period and is at least a part of the recognition period, in accordance with operation information obtained during the second time period;
second object processing programmed logic circuitry for sequentially changing the state of the object after the second time period based on at least the second behavior information; and
display control programmed logic circuitry for sequentially displaying an image of the object on a display means in accordance with the state of the object, wherein:

the first behavior information and the second behavior information each represent a position of the object in a virtual game world;

the first object processing programmed logic circuitry and the second object processing programmed logic circuitry move the object to the position in the virtual game world represented by at least one of the first behavior information and the second behavior information, the game apparatus further comprises determining programmed logic circuitry for determining that the input device has moved using the operation information to determine a moving velocity of the input device;

the first time period, the second time period and the recognition period start when the determination programmed logic circuitry determines that the input device has moved;

the first behavior setting programmed logic circuitry sets the first behavior information representing a position in the virtual game world to which the object is to move in accordance with a predetermined initial velocity;

the second behavior setting programmed logic circuitry sets the second behavior information representing a position in the virtual game world to which the object is to move in accordance with an initial velocity which is set based on the moving velocity of the input device determined during the second time period, the game processing is for executing a game in which a player character hits a ball so as to cause the ball to fly in the virtual game world;

the object is a ball object representing the ball moving in the virtual game world;

the initial velocity set by each of the first behavior setting programmed logic circuitry and the second behavior setting programmed logic circuitry is a velocity of the ball object given when the player character hits the ball object in the virtual game world; and the first behavior information and the second behavior information represent a trajectory in the virtual game world along which the ball object moves after being hit.

12. A game apparatus according to claim 10, wherein:

the determining programmed logic circuitry further determining a rotation motion of the input device around a predetermined direction as a rotation axis using the operation information; and the second behavior setting programmed logic circuitry sets a rotation to be given to the object in accordance with the rotation motion of the input device determined during the second time period, and sets the second behavior information representing a position in the virtual game world to which the object given the rotation is to move.

13. A game apparatus according to claim 10, wherein:

the determining programmed logic circuitry further determines a posture of the input device before the input device moves using the operation information; and the first behavior setting programmed logic circuitry sets a direction in which the object is to move in accordance with the posture of the input device determined by the determining programmed logic circuitry, and sets the first behavior information representing a position in the virtual game world to which the object is to move in the direction.

14. A game apparatus according to claim 4, wherein:

the game processing is for executing a game in which a player character swings an item possessed by the player character to hit a ball so as to cause the ball to fly in the virtual game world;

the game apparatus further comprises determining programmed logic circuitry for determining that the input device has moved using the operation information to determine at least a moving direction of the input device and a moving velocity of the input device;

the object is a player object representing a player character;

the first behavior setting programmed logic circuitry sets a series of motions of the player character swinging the item in a swinging direction in correspondence with the moving direction of the input device which is detected during the first time period as the first behavior information; and the second behavior setting programmed logic circuitry sets a series of motions of the player character swinging the item at a swinging velocity in correspondence with a moving velocity of the input device which is determined during the second time period in the swinging direction as the second behavior information.

15. A game apparatus according to claim 1, wherein:

the input device includes an acceleration sensor for detecting an acceleration generated in the input device; and the operation information includes acceleration data which is output from the acceleration sensor in accordance with a motion of the input device.

16. A game apparatus according to claim 1, further comprising determining programmed logic circuitry for determining that the input device is being swung using the operation information to determine at least a swinging direction of the input device; wherein:

the recognition period and the second time period are from the time when the determining programmed logic circuitry determines that the input device is being swung until the time when the determining programmed logic circuitry determines that the input device finishes being swung; and the first time period is from the time when the determining programmed logic circuitry determines that the input device is being swung until the time when the determining programmed logic circuitry determines the swinging direction of the input device.

17. A storage medium having stored thereon a game program executable by a computer of a game apparatus for executing game processing of changing a state of an object in accordance with an input given to an input device, the game program causing the computer to execute:

data obtaining for sequentially obtaining operation information which is output in accordance with a motion of the input device and storing the operation information in a memory;

first behavior setting for setting first behavior information representing a state of the object after a first time period, which is a part of a recognition period for determining a motion of the input device, in accordance with operation information obtained during the first time period using operation information;

first object processing for sequentially changing the state of the object after the first time period based on the first behavior information;

second behavior setting for setting second behavior information representing a state of the object after a second time period, which is terminated after the first time period and is at least a part of the recognition period, in accordance with operation information obtained during second time period;

second object processing for sequentially changing the state of the object after the second time period based on at least the second behavior information; and display control for sequentially displaying an image of the object on a display device in accordance with the state of the object, wherein the first behavior represents a trajectory of the object due to the motion of the input device from the beginning of the motion of the input device until a point before the end of the motion of the input device, and the second behavior represents a trajectory of the object due to the motion of the input device from the beginning of the motion of the input device until the end of the motion of the input device, and wherein the display control displays the image of the object based on gradual change of the trajectory of the object from said first behavior to said second behavior over a predetermined time period.

18. A storage medium having stored thereon the game program according to claim 17, wherein in the second object processing, the state of the object based on the first behavior information and the state of the object based on the second behavior information, which are of an identical time point after the second time period, are averaged at a predetermined ratio, and the ratio at which the state of the object based on the second behavior information contributes to the averaging is gradually increased along the passage of time, so as to sequentially change the state of the object.

19. A storage medium having stored thereon the game program according to claim 18, wherein:

the first behavior information and the second behavior information each represent a position of the object in a virtual game world; and in the first object processing and the second object processing, the object is moved to the position in the virtual game world represented by at least one of the first behavior information and the second behavior information.

20. A storage medium having stored thereon the game program according to claim 17, wherein:

the first behavior information and the second behavior information each represent a predetermined series of motions; in the first object processing, the object is caused to perform the series of motions represented by the first behavior information so as to change the state of the object; and in the second object processing, the object is caused to perform the series of motions represented by the second behavior information so as to change the state of the object.

21. A storage medium having stored thereon the game program according to claim 19, wherein:

the game program further causes the computer to execute determining that the input device has moved using the operation information to determine a moving velocity of the input device;

the first time period, the second time period and the recognition period start when it is determined in the determining that the input device has moved;

in the first behavior setting, the first behavior information representing a position in the virtual game world to which the object is to move is set in accordance with a predetermined initial velocity; and in the second behavior setting, the second behavior information representing a position in the virtual game world to which the object is to move is set in accordance with an initial velocity which is set based on the moving velocity of the input device determined during the second time period.

22. A storage medium having stored thereon a game program executable by a computer of a game apparatus for executing game processing of changing a state of an object in accordance with an input given to an input device, the game program causing the computer to execute:

data obtaining for sequentially obtaining operation information which is output in accordance with a motion of the input device and storing the operation information in a memory;

first behavior setting for setting first behavior information representing a state of the object after a first time period, which is a part of a recognition period for determining a motion of the input device, in accordance with operation information obtained during the first time period using operation information;

first object processing for sequentially changing the state of the object after the first time period based on the first behavior information;

second behavior setting for setting second behavior information representing a state of the object after a second time period, which is terminated after the first time period and is at least a part of the recognition period, in accordance with operation information obtained during second time period;

second object processing for sequentially changing the state of the object after the second time period based on at least the second behavior information; and display control for sequentially displaying an image of the object on a display device in accordance with the state of the object, wherein in the second object processing, the state of the object based on the first behavior information and the state of the object based on the second behavior information, which are of an identical time point after the second time period, are averaged at a predetermined ratio, and the ratio at which the state of the object based on the second behavior information contributes to the averaging is gradually increased along the passage of time, so as to sequentially change the state of the object, the first behavior information and the second behavior information each represent a position of the object in a virtual game world;

in the first object processing and the second object processing, the object is moved to the position in the virtual game world represented by at least one of the first behavior information and the second behavior information, the game program further causes the computer to execute determining that the input device has moved using the operation information to determine a moving velocity of the input device;

the first time period, the second time period and the recognition period start when it is determined in the determining that the input device has moved;

in the first behavior setting, the first behavior information representing a position in the virtual game world to which the object is to move is set in accordance with a predetermined initial velocity; and in the second behavior setting, the second behavior information representing a position in the virtual game world to which the object is to move is set in accordance with an initial velocity which is set based on the moving velocity of the input device determined during the second time period, wherein:

the game processing is for executing a game in which a player character hits a ball so as to cause the ball to fly in the virtual game world;

the object is a ball object representing the ball moving in the virtual game world;

the initial velocity set in each of the first behavior setting and the second behavior setting is a velocity of the ball object given when the player character hits the ball object in the virtual game world; and the first behavior information and the second behavior information represent a trajectory in the virtual game world along which the ball object moves after being hit.

23. A storage medium having stored thereon the game program according to claim 21, wherein:

in the determining, a rotation motion of the input device around a predetermined direction as a rotation axis is further determined using the operation information; and in the second behavior setting, a rotation to be given to the object is set in accordance with the rotation motion of the input device determined during the second time period, and the second behavior information representing a position in the virtual game world to which the object given the rotation is to move is set.

24. A storage medium having stored thereon the game program according to claim 21, wherein:

in the determining, a posture of the input device before the input device moves is further determined using the operation information; and in the first behavior setting, a direction in which the object is to move is set in accordance with the posture of the input device determined in the determining, and the first behavior information representing a position in the virtual game world to which the object is to move in the direction is set.

25. A storage medium having stored thereon the game program according to claim 17, wherein:

the first behavior information and the second behavior information each represent a position of the object in a virtual game world; and in the first object processing and the second object processing, the object is moved to the position in the virtual game world represented by at least one of the first behavior information and the second behavior information.

26. A storage medium having stored thereon the game program according to claim 25, wherein:

the game program further causes the computer to execute determining that the input device has moved using the operation information to determine a moving velocity of the input device;

the first time period, the second time period and the recognition period start when it is determined in the determining that the input device has moved;

in the first behavior setting, the first behavior information representing a position in the virtual game world to which the object is to move is set in accordance with a predetermined initial velocity; and in the second behavior setting, the second behavior information representing a position in the virtual game world to which the object is to move is set in accordance with an initial velocity which is set based on the moving velocity of the input device determined during the second time period.

27. A storage medium having stored thereon a game program executable by a computer of a game apparatus for executing game processing of changing a state of an object in accordance with an input given to an input device, the game program causing the computer to execute:

data obtaining for sequentially obtaining operation information which is output in accordance with a motion of the input device and storing the operation information in a memory;

first behavior setting for setting first behavior information representing a state of the object after a first time period, which is a part of a recognition period for determining a motion of the input device, in accordance with operation information obtained during the first time period using operation information;

first object processing for sequentially changing the state of the object after the first time period based on the first behavior information;

second behavior setting for setting second behavior information representing a state of the object after a second time period, which is terminated after the first time period and is at least a part of the recognition period, in accordance with operation information obtained during second time period;

second object processing for sequentially changing the state of the object after the second time period based on at least the second behavior information; and display control for sequentially displaying an image of the object on a display device in accordance with the state of the object, wherein:

the first behavior information and the second behavior information each represent a position of the object in a virtual game world; and in the first object processing and the second object processing, the object is moved to the position in the virtual game world represented by at least one of the first behavior information and the second behavior information, the game program further causes the computer to execute determining that the input device has moved using the operation information to determine a moving velocity of the input device;

the first time period, the second time period and the recognition period start when it is determined in the determining that the input device has moved;

in the first behavior setting, the first behavior information representing a position in the virtual game world to which the object is to move is set in accordance with a predetermined initial velocity;

in the second behavior setting, the second behavior information representing a position in the virtual game world to which the object is to move is set in accordance with an initial velocity which is set based on the moving velocity of the input device determined during the second time period, the game processing is for executing a game in which a player character hits a ball so as to cause the ball to fly in the virtual game world;

the object is a ball object representing the ball moving in the virtual game world;

the initial velocity set in each of the first behavior setting and the second behavior setting is a velocity of the ball object given when the player character hits the ball object in the virtual game world; and the first behavior information and the second behavior information represent a trajectory in the virtual game world along which the ball object moves after being hit.

28. A storage medium having stored thereon the game program according to claim 26, wherein:

in the determining, a rotation motion of the input device around a predetermined direction as a rotation axis is further determined using the operation information; and in the second behavior setting, a rotation to be given to the object is set in accordance with the rotation motion of the input device determined during the second time period, and the second behavior information representing a position in the virtual game world to which the object given the rotation is to move is set.

29. A storage medium having stored thereon the game program according to claim 26, wherein:

in the determining, a posture of the input device before the input device moves is further determined using the operation information; and in the first behavior setting, a direction in which the object is to move is set in accordance with the posture of the input device determined in the determining, and the first behavior information representing a position in the virtual game world to which the object is to move in the direction is set.

30. A storage medium having stored thereon the game program according to claim 20, wherein:

the game processing is for executing a game in which a player character swings an item possessed by the player character to hit a ball so as to cause the ball to fly in the virtual game world;

the game program further causes the computer to execute determining that the input device has moved using the operation information to determine at least a moving direction of the input device and a moving velocity of the input device;

the object is a player object representing a player character;

in the first behavior setting, a series of motions of the player character swinging the item in a swinging direction in correspondence with the moving direction of the input device which is determined during the first time period is set as the first behavior information; and in the second behavior setting, a series of motions of the player character swinging the item at a swinging velocity in correspondence with a moving velocity of the input device which is determined during the second time period in the swinging direction is set as the second behavior information.

31. A storage medium having stored thereon the game program according to claim 17, wherein:

the input device includes an acceleration sensor for detecting an acceleration generated in the input device; and the operation information includes acceleration data which is output from the acceleration sensor in accordance with a motion of the input device.

32. A storage medium having stored thereon the game program according to claim 17, wherein:

the game program further causes the computer to execute determining that the input device is being swung using the operation information to determine at least a swinging direction of the input device;

the recognition period and the second time period are from the time when it is determined in the determining that the input device is being swung until the time when it is determined in the determining that the input device finishes being swung; and the first time period is from the time when it is determined in the determining that the input device is being swung until the time when the swinging direction of the input device is determined in the determining.

33. The game apparatus according to claim 6, wherein:

the determining programmed logic circuitry further determining a rotation motion of the input device around a predetermined direction as a rotation axis using the operation information; and the second behavior setting programmed logic circuitry sets a rotation to be given to the ball object in accordance with the rotation motion of the input device determined during the second time period, and sets the second behavior information representing a position in the virtual game world to which the ball object given the rotation is to move.

34. The game apparatus according to claim 6, wherein:

the determining programmed logic circuitry further determines a posture of the input device before the input device moves using the operation information; and the first behavior setting programmed logic circuitry sets a direction in which the ball object is to move in accordance with the posture of the input device determined by the determining programmed logic circuitry, and sets the first behavior information representing a position in the virtual game world to which the ball object is to move in the direction.

35. The game apparatus according to claim 11, wherein:

the determining programmed logic circuitry further determining a rotation motion of the input device around a predetermined direction as a rotation axis using the operation information; and the second behavior setting programmed logic circuitry sets a rotation to be given to the ball object in accordance with the rotation motion of the input device determined during the second time period, and sets the second behavior information representing a position in the virtual game world to which the ball object given the rotation is to move.

36. The game apparatus according to claim 11, wherein:

the determining programmed logic circuitry further determines a posture of the input device before the input device moves using the operation information; and the first behavior setting programmed logic circuitry sets a direction in which the ball object is to move in accordance with the posture of the input device determined by the determining programmed logic circuitry, and sets the first behavior information representing a position in the virtual game world to which the ball object is to move in the direction.

37. The storage medium having stored thereon the game program according to claim 22, wherein:

in the determining, a rotation motion of the input device around a predetermined direction as a rotation axis is further determined using the operation information; and in the second behavior setting, a rotation to be given to the ball object is set in accordance with the rotation motion of the input device determined during the second time period, and the second behavior information representing a position in the virtual game world to which the ball object given the rotation is to move is set.

38. The storage medium having stored thereon the game program according to claim 22, wherein:

in the determining, a posture of the input device before the input device moves is further determined using the operation information; and in the first behavior setting, a direction in which the ball object is to move is set in accordance with the posture of the input device determined in the determining, and the first behavior information representing a position in the virtual game world to which the ball object is to move in the direction is set.

39. The storage medium having stored thereon the game program according to claim 27, wherein:

in the determining, a rotation motion of the input device around a predetermined direction as a rotation axis is further determined using the operation information; and in the second behavior setting, a rotation to be given to the ball object is set in accordance with the rotation motion of the input device determined during the second time period, and the second behavior information representing a position in the virtual game world to which the ball object given the rotation is to move is set.

40. The storage medium having stored thereon the game program according to claim 27, wherein:

in the determining, a posture of the input device before the input device moves is further determined using the operation information; and in the first behavior setting, a direction in which the ball object is to move is set in accordance with the posture of the input device determined in the determining, and the first behavior information representing a position in the virtual game world to which the ball object is to move in the direction is set.

\* \* \* \* \*